United States Patent
Tani et al.

(10) Patent No.: US 8,965,427 B2
(45) Date of Patent: Feb. 24, 2015

(54) MOBILE COMMUNICATION SYSTEM, MOBILE STATION APPARATUS, BASE STATION APPARATUS, AND SETTING CHANGE METHOD

(75) Inventors: Mitsuhiro Tani, Kawasaki (JP); Masatomo Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 408 days.

(21) Appl. No.: 13/433,810

(22) Filed: Mar. 29, 2012

(65) Prior Publication Data

US 2012/0184320 A1 Jul. 19, 2012

Related U.S. Application Data

(63) Continuation of application No. PCT/JP2009/067549, filed on Oct. 8, 2009.

(51) Int. Cl.
| | |
|---|---|
| H04B 7/00 | (2006.01) |
| H04W 4/00 | (2009.01) |
| H04M 3/00 | (2006.01) |

(Continued)

(52) U.S. Cl.
CPC ........ *H04W 56/0015* (2013.01); *H04W 52/386* (2013.01); *H04W 52/40* (2013.01)
USPC ........... 455/502; 455/507; 455/434; 455/515; 455/422.1; 455/420

(58) Field of Classification Search
CPC ............................... H04W 52/386; H04B 7/00
USPC ........................ 455/509, 502, 717, 343, 507
See application file for complete search history.

(56) References Cited

U.S. PATENT DOCUMENTS

| | | | |
|---|---|---|---|
| 6,510,319 B2 * | 1/2003 | Baum et al. | 455/442 |
| 6,708,041 B1 * | 3/2004 | Butovitsch et al. | 455/522 |

(Continued)

FOREIGN PATENT DOCUMENTS

| | | |
|---|---|---|
| JP | 2002-509381 | 3/2002 |
| JP | 2002-185400 | 6/2002 |

(Continued)

OTHER PUBLICATIONS

Notice of Reasons for Rejection dated Mar. 26, 2013, from corresponding Japanese Application No. 2011-535245.

(Continued)

*Primary Examiner* — Tilahun B Gesesse
(74) *Attorney, Agent, or Firm* — Katten Muchin Rosenman LLP

(57) ABSTRACT

In a mobile communication system, a base station apparatus stores setting change information which includes setup information that is changed in accordance with a prescribed event when the prescribed event occurs, timing information that specifies a timing for making a setting change, and trigger information that specifies an action based on which the base station apparatus and a mobile station apparatus compute the setting change timing for the base station apparatus and the mobile station apparatus, respectively; and transmits, in advance of occurrence of the prescribed event, the setting change information to the mobile station apparatus. When the action specified in the trigger information occurs, the mobile station apparatus and the base station apparatus each determine the setting change timing in accordance with the timing information and effect the setting change at the determined timing in accordance with the setup information.

16 Claims, 10 Drawing Sheets

(51) Int. Cl.
*H04W 56/00* (2009.01)
*H04W 52/38* (2009.01)
*H04W 52/40* (2009.01)

(56) References Cited

U.S. PATENT DOCUMENTS

| | | | |
|---|---|---|---|
| 7,299,065 B2 | 11/2007 | Choi et al. | |
| 7,688,878 B2 * | 3/2010 | Wang et al. | 375/130 |
| 8,249,578 B2 * | 8/2012 | Yagyu et al. | 455/420 |
| 2003/0002472 A1 * | 1/2003 | Choi et al. | 370/347 |
| 2004/0242255 A1 | 12/2004 | Hayashi et al. | |
| 2005/0277419 A1 | 12/2005 | Takano et al. | |
| 2008/0032684 A1 * | 2/2008 | Yagyu et al. | 455/420 |

FOREIGN PATENT DOCUMENTS

| | | |
|---|---|---|
| JP | 2003-115796 | 4/2003 |
| JP | 2004-7030 | 1/2004 |
| WO | 99/31819 | 6/1999 |
| WO | 03/032528 | 4/2003 |

OTHER PUBLICATIONS

3GPP TS 25.331 V5.24.0. 3rd Generation Partnership Project; Technical Specification Group Radio Access Network; Radio Resource Control (RRC); Protocol Specification (Release 5), Jun. 18, 2009, pp. 63-65, Retrieved from: http://www.3gpp.org/ftp/Specs/archive/25_series/25.331/25331-5o0.zip.

3GPP TS 36.331 V8.7.0 3rd Generation Partnership Project; Technical Specification Group Radio Access Network; Evolved Universal Terrestrial Radio Access (E-UTRA) Radio Resource Control (RRC); Protocol Specification (Release 8), Sep. 29, 2009, pp. 20-22, Retrieved from: http://www.3gpp.org/ftp/Specs/archive/36_series/36.331/36331-870.zip.

International Search Report dated Jan. 12, 2010, from corresponding International Application No. PCT/JP2009/067549.

* cited by examiner

| NUMBER OF COMMUNICATION CELLS | POWER OFFSET | BASE STATION TRIGGER | MOBILE STATION TRIGGER | SPECIFIC TIMING | TIME DIFFERENCE |
|---|---|---|---|---|---|
| 1 | A | RECEPTION OF COMMUNICATION CELL ADD/DELETE COMMAND | RECEPTION OF COMMUNICATION CELL SET UPDATE INFORMATION | 100(CFN) | 500(msec) |
| 2 | B | | | | |
| 3 | C | | | | |

| | | Carrier 4 | Carrier 3 | Carrier 2 | Carrier 1 |
|---|---|---|---|---|---|
| BTS3 (503) | SECTOR 6 | O | O | O | O |
| | SECTOR 5 | O | O | O | O |
| | SECTOR 4 | O | O | O | O |
| | SECTOR 3 | O | O | O | O |
| | SECTOR 2 | O | O | O | O |
| | SECTOR 1 | O | O | O | O |
| BTS2 (502) | SECTOR 6 | O | H | H | D |
| | SECTOR 5 | O | H | H | D |
| | SECTOR 4 | O | H | H | D |
| | SECTOR 3 | O | H | H | D |
| | SECTOR 2 | O | H | H | D |
| | SECTOR 1 | O | H | H | D |
| BTS1 (501) | SECTOR 6 | O | D | H | O |
| | SECTOR 5 | H | O | D | H |
| | SECTOR 4 | D | H | O | D |
| | SECTOR 3 | O | O | O | O |
| | SECTOR 2 | H | H | H | H |
| | SECTOR 1 | D | D | D | D |

MOBILE COMMUNICATION SYSTEM, MOBILE STATION APPARATUS, BASE STATION APPARATUS, AND SETTING CHANGE METHOD

CROSS-REFERENCE TO RELATED APPLICATION

This application is a continuation application and is based upon PCT/JP2009/67549, filed on Oct. 8, 2009, the entire contents of which are incorporated herein by reference.

FIELD

The embodiments discussed herein are related to a mobile communication system, a mobile station apparatus, a base station apparatus, and a method for changing setup information for the mobile station apparatus and base station apparatus.

BACKGROUND

In a mobile communication system, the number of base stations, or the number of cells or sectors, to which a mobile station apparatus such as a user terminal is linked via radio at one time constantly changes according to the current location or radiowave reception conditions of the mobile station apparatus or as the mobile station apparatus moves from one location to another.

Adding a new communication cell or deleting a communication cell is performed by a radio network controller (RNC) connected to the base station apparatus. For this purpose, the RNC sends a signal to notify the base station apparatus and mobile station apparatus of a change in the number of communication cells, and receives information responding to the change in the number of communication cells from the base station apparatus and mobile station apparatus.

When the number of communication cells is changed for a particular mobile station apparatus, if the total amount of power received at that mobile station apparatus changes, the mobile station apparatus may not be able to properly reproduce the received signal. In view of this, the base station apparatus connected via radio to the particular mobile station apparatus adjusts the transmit power of each cell so that the total amount of the transmit powers of all the serving cells is maintained constant during communication in order to prevent the received power at the mobile station apparatus from being affected by the change in the number of communication cells. For example, suppose that the number of communication cells has increased from 1 to 2; then, the base station apparatus reduces the transmit power of each cell to one-half its original transmit power.

In a mobile communication system, the base station apparatus maintains a radio link with each mobile station apparatus by utilizing a signal received from the mobile station apparatus. For example, if the base station apparatus utilizes the call control defined in the Release 99 standard developed by the 3GPP (Third Generation Partnership Project), the base station apparatus controls the power of transmit signals. Such signals are transmitted, for example, via a downlink-dedicated physical data channel (DL-DPDCH) and a downlink-dedicated physical control channel (DL-DPCCH). The base station apparatus controls the transmit signal power by utilizing a transmission power control command (TPC) received from the mobile station apparatus via an uplink-dedicated physical control channel (UL-DPCCH).

Further, in the call control provision of the High-Speed Downlink Packet Access (HSDPA) defined in the Release 5 and later standards developed by the 3GPP, High-Speed Physical Downlink Shared Channel (HS-PDSCH) is defined as one of channels for carrying user data. Further, in the HSDPA, High-Speed Shared Control Channel (HS-SCCH) is defined that carries control information for transmitting data over the HS-PDSCH. The transmit power of the HS-SCCH is determined by the sum of the transmit power of the DL-DPCCH and the transmit power offset of the HS-SCCH. In a mobile communication system employing the call control conforming to the HSDPA, when the number of communication cells is changed for a mobile station apparatus, the transmit power of the DL-DPCCH increases or decreases correspondingly. Accordingly, the base station apparatus adjusts the transmit power offset of the HS-SCCH so that the transmit power of the HS-SCCH will not be affected by the change in the number of communication cells. To adjust the transmit power offset of the HS-SCCH so as to accommodate the change in the number of communication cells, control signals are transferred between the RNC, the base station apparatus, and the mobile station apparatus in a prescribed order.

As described above, in order to maintain the communication, the mobile station apparatus and the base station apparatus share the necessary control information and update the setting at predefined timing based on the control information. In view of this, a technology has been developed that allows the mobile station apparatus and the base station apparatus to share prescribed control information so that the mobile station apparatus and the base station apparatus can update the setting in a synchronized fashion, based on the control information (refer, for example, to Japanese Laid-open Patent Publication No. 2003-115796, Published Japanese Translation of PCT application No. 2002-509381, and Japanese Laid-open Patent Publication No. 2002-185400).

In one such prior art example, when a base station controller generates or changes information concerning high speed forward packet connection service, the generated or changed information is transmitted to the base station and terminal equipment along with an indicator indicating that a change has been made to the information. The base station and the terminal equipment receive the generated or changed information and operate at the same time in an identical manner. According to this prior art, the timing at which the base station controller changes the information is defined by the system frame number (SFN), and its timing is reported from the base station controller to the base station and the terminal equipment.

In another prior art example, at the beginning of a handover, a radio network controller orders each serving base station to measure the transmit power to a mobile station being served. Each serving base station then measures its transmit power to the mobile station and reports the power level measurements to the radio network controller. An initial transmit power setting is determined for a new target base station being added in a diversity handover situation, and, for example, new transmit power settings are determined for the serving base stations synchronized to a particular time. At or about synchronizing time, the target base station transmits a signal to the mobile station at the initial power setting, and at or about the same time, the serving base stations adjust their transmit powers toward the new values.

In still another prior art example, each base station examines the amount of loss of a base station select signal and, if the amount of loss exceeds a given value, its transmit power is not reduced even if the base station is not a main base station. Each base station in a soft handover situation constantly updates the main base station conditions at a predetermined timing so that the main base station update timing at the mobile station is synchronized. Further, in this prior art example, the output conditions are updated at all base stations, based on the downlink slots of the same series number.

According to the above prior art, the timing at which the base station apparatus and the mobile station apparatus change the setup information is determined by the RNC. Then, each time the setup information is changed, the RNC notifies the base station apparatus and mobile station apparatus of the timing to change the setup information. Further, the mobile station apparatus and the base station apparatus each transmit a message to the RNC to report the reception of the notification. As a result, each time a change occurs in the setup information, the control information is transferred back and forth between the respective apparatuses.

Further, when the mobile station apparatus is communicating with some other apparatus, the number of communication cells to which the mobile station apparatus is linked constantly changes. Then, each time the number of communication cells changes, control information necessary to change the number of communication cells is transferred between the RNC, the base station apparatus, and the mobile station apparatus. The larger the number of mobile station apparatuses connected to the mobile communication system, the larger the amount of communication associated with the transfer of the control information becomes. As a result, as the number of mobile station apparatuses connected to the mobile communication system increases, the network load and the power consumption for the entire mobile communication system increase. In some cases, congestion may occur as the amount of communication increases, eventually bringing down the entire mobile communication system.

SUMMARY

According to one embodiment, there is provided a mobile communication system which includes a base station apparatus and a mobile station apparatus linked via radio to the base station apparatus. In the mobile communication system, the base station apparatus stores setting change information which includes setup information that is changed in accordance with a first event when the first event occurs, timing information that specifies a timing for making a setting change, and trigger information that specifies an action based on which the base station apparatus and the mobile station apparatus compute the setting change timing for the base station apparatus and the mobile station apparatus, respectively, and the base station apparatus transmits, in advance of occurrence of the first event, the setting change information to the mobile station apparatus located within a communication area served by the base station apparatus. When the action specified in the trigger information occurs, the mobile station apparatus and the base station apparatus each determine the setting change timing in accordance with the timing information included in the setting change information and effect the setting change at the determined timing in accordance with the setup information included in the setting change information.

According to another embodiment, there is provided a base station apparatus. The base station apparatus includes: a storage unit which stores setting change information which includes setup information that is changed in accordance with a prescribed event when the prescribed event occurs, timing information that specifies a timing for making a setting change, and trigger information that specifies an action based on which the base station apparatus and a mobile station apparatus compute the setting change timing for the base station apparatus and the mobile station apparatus, respectively; a radio interface unit which transmits, in advance of occurrence of the prescribed event, the setting change information to the mobile station apparatus located within a communication area served by the base station apparatus; and a control unit which, when the action specified in the trigger information occurs, determines the setting change timing in accordance with the timing information included in the setting change information, and effects the setting change at the determined timing in accordance with the setup information included in the setting change information.

According to still another embodiment, there is provided a mobile station apparatus. The mobile station apparatus includes: a radio interface unit which receives, from a base station apparatus, setting change information which includes setup information that is changed in accordance with a prescribed event when the prescribed event occurs, timing information that specifies a timing for making a setting change, and trigger information that specifies an action based on which the base station apparatus and the mobile station apparatus compute the setting change timing for the base station apparatus and the mobile station apparatus, respectively; and a control unit which, when the action specified in the trigger information occurs, determines the setting change timing in accordance with the timing information included in the setting change information, and effects the setting change at the determined timing in accordance with the setup information included in the setting change information.

According to yet another embodiment, there is provided a setting change method for use in a mobile communication system which includes a base station apparatus and a mobile station apparatus linked via radio to the base station apparatus. In the setting change method, the base station apparatus, which stores setting change information which includes setup information that is changed in accordance with a prescribed event when the prescribed event occurs, timing information that specifies a timing for making a setting change, and trigger information that specifies an action based on which the base station apparatus and the mobile station apparatus compute the setting change timing for the base station apparatus and the mobile station apparatus, respectively, transmits, in advance of occurrence of the prescribed event, the setting change information to the mobile station apparatus located within a communication area served by the base station apparatus and, when the action specified in the trigger information occurs, the base station apparatus determines the setting change timing in accordance with the timing information included in the setting change information, and effects the setting change at the thus determined timing in accordance with the setup information included in the setting change information. On the other hand, the mobile station apparatus receives the setting change information from the base station apparatus and, when the action specified in the trigger information included in the setting change information occurs, the mobile station apparatus determines the setting change timing in accordance with the timing information included in the setting change information, and effects the setting change at the determined timing in accordance with the setup information included in the setting change information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of how various setting change timing determining methods are selected for use.

DESCRIPTION OF EMBODIMENTS

A mobile communication system according to one embodiment will be described below with reference to the drawings. In this mobile communication system, autonomous setting change information which includes information after a setting change is made and the setting change timing computed based on a prescribed trigger is stored in advance in a base station apparatus for each event that may require that the base station apparatus and mobile station apparatus change the setting in synchronized fashion. The base station apparatus sends the autonomous setting change information to each mobile station apparatus located within the communication area of the base station apparatus, by including the autonomous setting change information in control information such as broadcast information periodically transmitted to the mobile station apparatus. When the occurrence of a trigger event is detected, the base station apparatus and the mobile station apparatus autonomously determine the timing for changing the setup information by referring to the autonomous setting change information, and change the setup information at the thus determined timing. In this way, the mobile communication system reduces the amount of communication that occurs between the respective apparatuses when changing the setup information.

Figure 1:
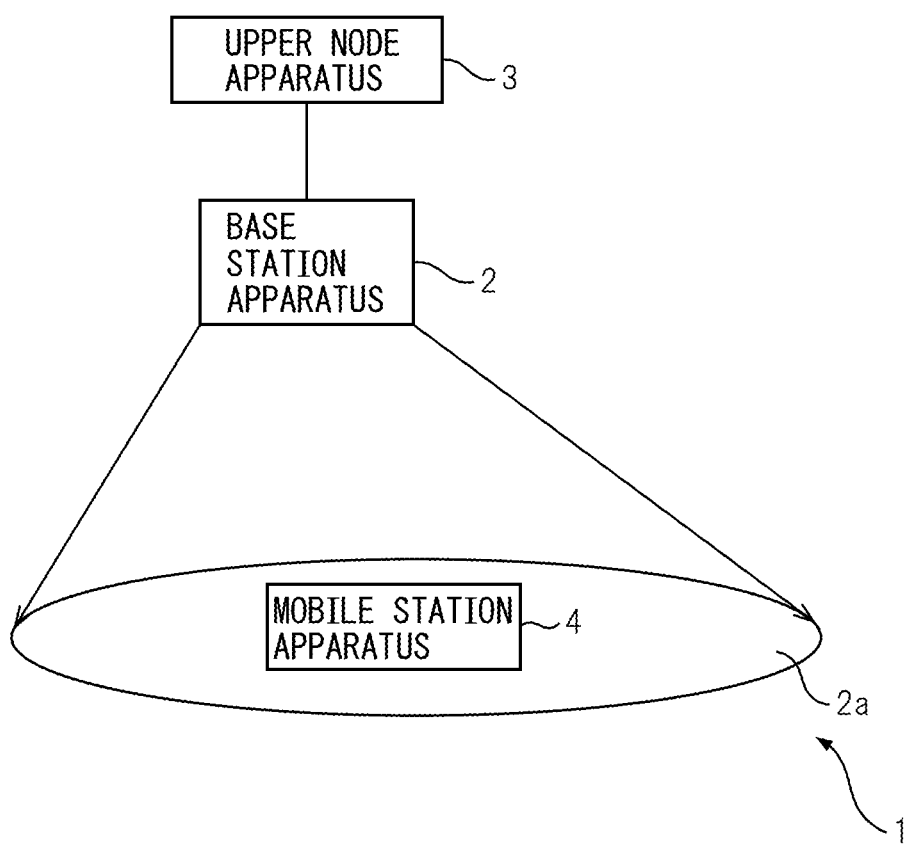
FIG. 1 is a diagram schematically illustrating the configuration of a mobile communication system according to one embodiment.

FIG. 1 is a diagram schematically illustrating the configuration of the mobile communication system according to the one embodiment. The mobile communication system 1 includes a base station apparatus 2, an upper node apparatus 3, and a mobile station apparatus 4. The base station apparatus 2 is connected to the upper node apparatus 3 via a communication network. In FIG. 1, the mobile communication system 1 is illustrated as including one base station apparatus and one mobile station apparatus, as an example. However, the mobile communication system 1 may include more than one base station apparatus and more than one mobile station apparatus.

The base station apparatus 2 is an apparatus that relays communications between the mobile station apparatus 4 and the upper node apparatus 3. The upper node apparatus 3 is an apparatus that relays communications between the mobile station apparatus 4 and a core network. The upper node apparatus 3 is, for example, an RNC.

When the mobile station apparatus 4 enters the communication area 2a of the base station apparatus 2, the mobile station apparatus 4 can communicate via radio with the base station apparatus 2 that covers the communication area 2a. When a radio link is established between the mobile station apparatus 4 and the serving base station apparatus 2, an uplink signal transmitted from the mobile station apparatus 4 is relayed via the base station apparatus 2 on to the upper node apparatus 3. The upper node apparatus 3 performs routing and transmits the received uplink signal, for example, over the core network, to another upper node apparatus (not depicted). When a downlink signal from that other upper node apparatus is received over the core network, the upper node apparatus 3 transmits the received downlink signal to the mobile station apparatus 4 via the base station apparatus 2 to which the mobile station apparatus 4 is linked via radio.

The base station apparatus 2, the upper node apparatus 3, and the mobile station apparatus 4 may each be an apparatus that complies with the International Telecommunications Union's IMT-2000.

If there occurs a change in the number of sectors or in the number of base station apparatuses to which the mobile station apparatus 4 can be linked via radio, the upper node apparatus 3 may change the number of communication cells for the mobile station apparatus 4. If this happens, the base station apparatus 2 to which the mobile station apparatus 4 is linked via radio adjusts its transmit power to the mobile station apparatus 4, as previously described. In this case, in order to maintain the communication, the mobile station apparatus 4 and the base station apparatus 2 to which the mobile station apparatus 4 is linked via radio correct in synchronized fashion the setup information concerning the transmit power of the base station apparatus 2, etc.

For the base station apparatus 2 and the mobile station apparatus 4 to change the setup information in synchronized fashion, autonomous setting change information which is used when changing the desired setup information is stored in advance within the station data that is used as setup information for the operation of the base station apparatus 2. Such autonomous setting change information is prestored, for example, in a storage device maintained in the base station apparatus 2, and is retrieved from the storage device when the base station apparatus 2 is powered up. The autonomous setting change information for the base station apparatus 2 may instead be held in the upper node apparatus 3. In this case, the upper node apparatus 3 may include the autonomous setting change information in the common cell setting information to be transmitted to the base station apparatus 2 when the base station apparatus 2 is powered up.

The mobile station apparatus 4 acquires the autonomous setting change information from the serving base station apparatus 2. The base station apparatus 2 may transmit the autonomous setting change information by including it, for example, in the broadcast information periodically transmitted to the base station apparatus 4. Such message transmission may be implemented, for example, in the form of system information that is transmitted on a broadcast control channel (BCCH). In this way, the mobile station apparatus 4 and the base station apparatus 2 can share the information used to change the setup information, before an event necessitating a change to the setup information occurs.

The autonomous setting change information includes a value to be specified after a setting change has been made to specific setup information. The autonomous setting change information further includes setting change timing information that defines the timing for making the setting change and trigger information that indicates the type of action that provides a trigger to compute the setting change timing. The autonomous setting change information may further include trigger time difference information that indicates an estimate of the time difference between the time at which an action that provides a trigger occurs in either the base station apparatus 2 or the mobile station apparatus 4 and the time at which an action that addresses the trigger occurs in the other.

In the present embodiment, specific timing specified by connection frame number (CFN) is set as the setting change timing information. The specific timing is given as a value that falls within the range of values that the CFN can take, for example, within the range of 0 to 255, and the setting change timing information also includes the number of repetitions of the CFN cycle that is repeated after an action corresponding to a trigger has occurred. The CFN is a numeric value assigned to each frame of the downlink signal, and increments by one in sequence, starting from 0. When the CFN has reached its maximum value (i.e., 255), the minimum value of the CFN (i.e., 0) is assigned to the next frame.

The trigger information indicates, for example, for the base station apparatus 2, that a control command for changing the number of communication cells has been received or a response message to that control command has been transmitted. Such control commands include, for example, Radio Link Addition Request and Radio Link Deletion Request. On the other hand, response messages include Radio Link Addition Response and Radio Link Deletion Response. For the mobile station apparatus 4, the trigger information indicates, for example, that Active Set Update as communication cell set update information has been received or Active Update Complete as a response message to that command has been transmitted.

The trigger time difference information may provide an estimated length of time, in milliseconds, that elapses from the time at which the action specified in the trigger information occurs in either the base station apparatus 2 or the mobile station apparatus 4 until the time at which the action specified in the trigger information occurs in the other. Alternatively, the trigger time difference information may define the estimated length of time in terms of the number of frames. For example, if the cycle of the CFN at the time of occurrence of the trigger action in the base station apparatus 2 and the cycle of the CFN at the time of occurrence of the trigger action in the mobile station apparatus 4 do not match, the base station apparatus 2 and the mobile station apparatus 4 can estimate the displacement in the cycle based on the trigger time difference information.

However, it should be noted that the trigger time difference information provides no more than an estimate. Accordingly, the length of time that actually elapses from the time the trigger action occurs in either the base station apparatus 2 or the mobile station apparatus 4 until the time the trigger action occurs in the other, may differ from the length of time indicated by the trigger time difference information. In view of this, not only the trigger time difference information but information specifying the specific timing for effecting the setting change may also be used in order for the mobile station apparatus 4 and the base station apparatus 2 to effect the setting change at the same time.

Figure 2:
FIG. 2 is a diagram illustrating one example of autonomous setting change information.

FIG. 2 is a diagram illustrating one example of the autonomous setting change information. The autonomous setting change information 200 concerns an event that involves a change in the number of communication cells for the mobile station apparatus 4. The autonomous setting change information 200 includes the transmit power offset value of the HS-SCCH which is changed as the number of communication cells changes in the call control of the HSDPA. A value appropriate to the number of communication cells after the change has been made is set as the transmit power offset value. For example, an offset value A is set when the number of communication cells is "1". Instead of the offset value itself, the autonomous setting change information 200 may include a symbol indicating that the currently set offset value is to be multiplied by the ratio of the number Na of communication cells after the setting is changed to the number Np of communication cells before the setting is changed (Na/Np ratio). Further, the autonomous setting change information 200 includes a code XXX that indicates the reception of a communication cell add/delete command, as the trigger information for the base station apparatus 2. The autonomous setting change information 200 also includes a code YYY that indicates the reception of communication cell set update information, as the trigger information for the mobile station apparatus 4. Further, the specific timing defined by the CFN value=100 is specified as the setting change timing information, and the number of repetitions=5 is also specified. On the other hand, 500 msec is specified as the trigger difference information.

Figure 3:
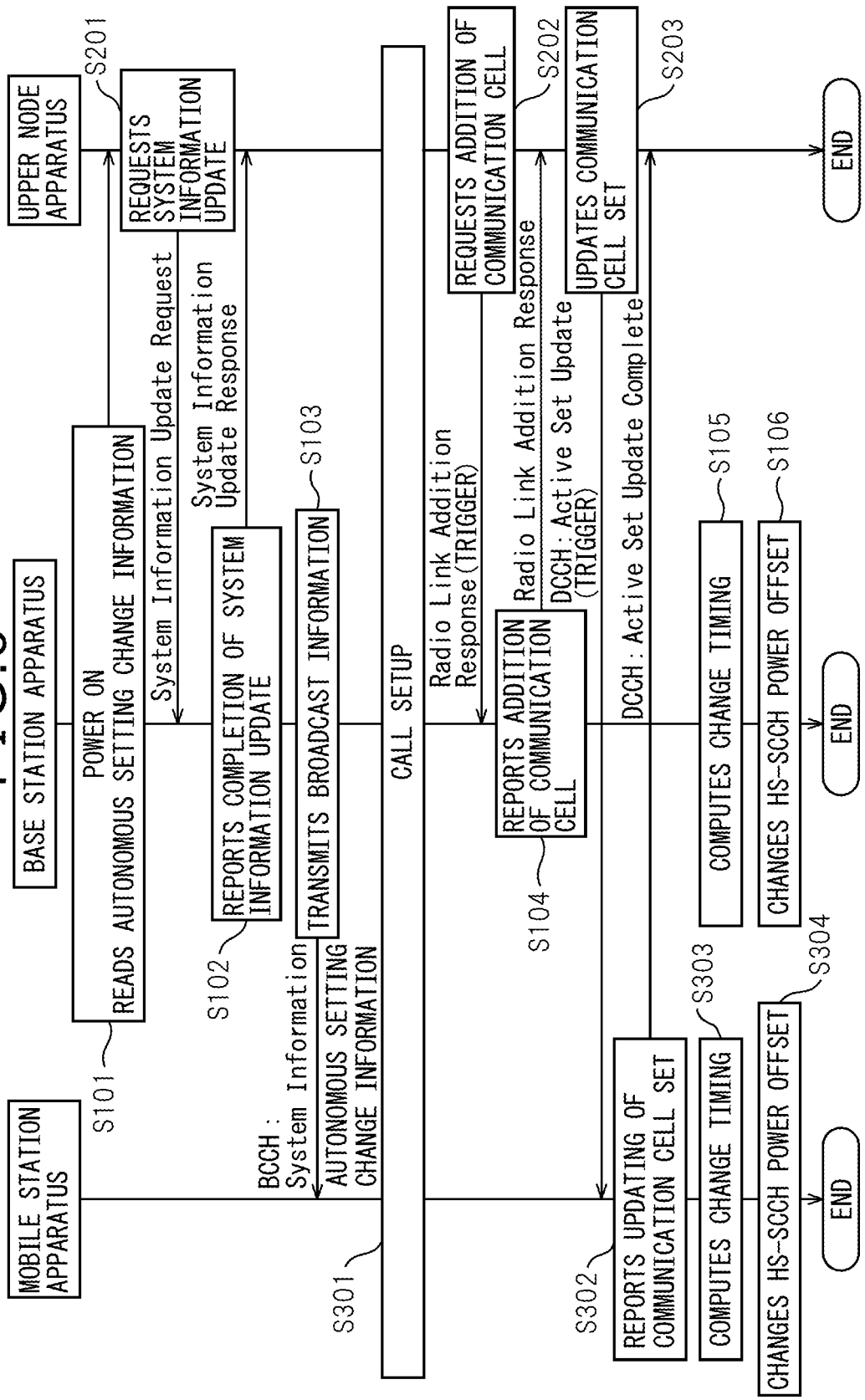
FIG. 3 is an operation sequence diagram illustrating one example of a setting change process.

FIG. 3 is an operation sequence diagram illustrating the setup information changing process performed in the mobile communication system 1. In the illustrated example, of the plurality of sectors served by the base station apparatus 2, a sector currently not used for radio linking to the mobile station apparatus 4 is newly added in the list of sectors to which the mobile station apparatus 4 is radio-linked. That is, a new communication cell is added for connection to the mobile station apparatus 4. As the number of communication cells for the mobile station apparatus 4 thus increases, the transmit power offset of the HS-SCCH is changed in accordance with the setup information changing process.

Upon power on, the base station apparatus 2 reads its station data setting from the storage device maintained in the apparatus, and sets the transmit power offset of the HS-SCCH in accordance with the station data setting. Further, the base station apparatus 2 retrieves the autonomous setting change information from the storage device. In the illustrated example, as the specific timing included in the setting change timing information, the CFN value is set to 100 and the number of repetitions of the CFN cycle that is repeated after an action corresponding to a trigger has occurred is set to 5. The trigger time difference information indicates 500 ms, i.e., 50 frames, as the time difference. Further, the reception of a communication cell add/delete command is set as the trigger information for the base station apparatus 2, and the reception of communication cell set update information is set as the trigger information for the mobile station apparatus 4.

The base station apparatus 2 notifies the upper node apparatus 3 that power has been turned on (step S101).

The upper node apparatus 3 requests the notifying base station apparatus 2 to update the system information (step S201). For example, the upper node apparatus 3 sends a command for requesting the updating of the system information, such as System Information Update Request defined in a call control protocol such as the NodeB Application Part (NBAP), to the base station apparatus 2.

Upon updating the system information, the base station apparatus 2 notifies the upper node apparatus 3 that the system information has been updated (step S102). In this case, the base station apparatus 2 sends, for example, System Information Update Response defined in the NBAP, to the upper node apparatus 3.

Further, the base station apparatus 2 transmits, in accordance with the radio resource control (RRC) protocol, broadcast information to the mobile station apparatus 4 located within its communication area (step S103). At this time, the base station apparatus 2 includes the autonomous setting change information in the broadcast information, i.e., the system information, and transmits out the system information on the BCCH periodically at predetermined intervals of time. As a result, any mobile station apparatus 4 that has entered the communication area of the base station apparatus 2 can share the autonomous setting change information with the base station apparatus 2.

After that, when the mobile station apparatus 4 makes a request to initiate communication with some other communication terminal, or when some other communication terminal makes a request to initiate communication with the mobile station apparatus 4, call setup is performed between the mobile station apparatus 4 and the upper node apparatus 3 through the base station apparatus 2. Then, the connection between the mobile station apparatus 4 and the upper node apparatus 3 is established (step S301). The call setup here is performed, for example, in accordance with the HSDPA.

After that, when a condition for adding a new communication cell for the mobile station apparatus 4 is satisfied, the upper node apparatus 3 sends a communication cell addition notification to the base station apparatus 2 to which the mobile station apparatus 4 is currently radio-linked (step S202).

In the present embodiment, the reception of Radio Link Addition Request, which is a communication cell add request command that the upper node apparatus 3 transmits to the base station apparatus 2 in accordance with the NBAP protocol, provides a trigger for the base station apparatus 2 to effect the setting change. For example, suppose that the base station apparatus 2 received the control command at the timing of $CFN=10$. Then, the base station apparatus 2 stores the CFN value at the time of occurrence of the trigger action in its storage device.

The base station apparatus 2 notifies the upper node apparatus 3 of the addition of the communication cell by sending a Radio Link Addition Response message to the upper node apparatus 3 in accordance with the NBAP protocol (step S104).

The upper node apparatus 3 transmits to the mobile station apparatus 4 the communication cell set update information after the number of communication cells has been changed (step S203).

In the present embodiment, the upper node apparatus 3 transmits Active Set Update, which is a command for reporting the communication cell set, to the mobile station apparatus 4 over a dedicated control channel (DCCH) in accordance with the RRC protocol. The reception of the Active Set Update at the mobile station apparatus 4 provides a trigger for the mobile station apparatus 4 to effect the setting change. For example, suppose that the mobile station apparatus 4 received the control command at the timing of $CFN=59$. Then, the mobile station apparatus 4 stores the CFN value at the time of occurrence of the trigger action in its storage device.

The mobile station apparatus 4 notifies the upper node apparatus 3 of the completion of the communication cell set update by sending Active Set Complete to the upper node apparatus 3 over the DCCH in accordance with the RRC protocol (step S302).

The base station apparatus 2 computes the timing for effecting the setting change (step S105). That is, using the following equation, the base station apparatus 2 computes the setting change timing $T_{bc}$ (msec) relative to the time of occurrence of the trigger for the base station apparatus 2 (i.e., relative to 0 msec).

$$T_{bc} = (CFN_c - CFN_{btrig} + CFN_{cyc} \times N_r) \times T_f \quad (1)$$

where $CFN_c$ is the CFN representing the specific timing included in the autonomous setting change information, and $CFN_{btrig}$ is the CFN at the time of occurrence of the trigger action. Further, $CFN_{cyc}$ represents the number of frames in one cycle of the CFN, which is, for example, 256. $N_r$ represents the number of repetitions of the CFN cycle that is repeated after the trigger action has occurred. $T_f$ represents the interval between frame transmissions, which is, for example, 10 msec. In the illustrated example, since $CFN_c=100$, $CFN_{btrig}=10$, $CFN_{cyc}=256$, $N_r=5$, and $T_f=10$, it follows that $T_{bc}=(100-10+256\times5)\times10=13700$ (msec).

The mobile station apparatus 4 computes the timing for effecting the setting change, independently of the base station apparatus 2 (step S303).

That is, using the following equation, the mobile station apparatus 4 computes the setting change timing $T_{mc}$ (msec) relative to the time of occurrence of the trigger for the mobile station apparatus 4 (that is, relative to 0 msec).

$$T_{mc} = (CFN_c - CFN_{mtrig} + CFN_{cyc} \times (N_r - \text{floor}(T_{dif}/T_f/CFN_{cyc}))) \times T_f$$

if $(CFN_{btrig} \leq CFN_{mtrig})$ \quad (2)

$$T_{mc} = (CFN_c - CFN_{mtrig} + CFN_{cyc} \times (N_r - \text{floor}(T_{dif}/T_f/CFN_{cyc}) - 1)) \times T_f$$

else if $(CFN_{btrig} > CFN_{mtrig})$ where $CFN_c$ is the CFN representing the specific timing included in the autonomous setting change information, and $CFN_{mtrig}$ is the CFN at the time of occurrence of the trigger action. Further, $CFN_{cyc}$ represents the number of frames in one cycle of the CFN, which is, for example, 256. $N_r$ represents the number of repetitions of the CFN cycle that is repeated after the trigger action has occurred. $T_f$ represents the interval between frame transmissions, which is, for example, 10 msec. $T_{dif}$ (msec) is the trigger time difference information. On the other hand, floor(x) is a function that returns a maximum integer value not larger than the variable x. Further, the mobile station apparatus 4 estimates $CFN_{btrig}$, i.e., the CFN at the time of occurrence of the trigger action at the base station apparatus 2, as being equivalent to $(CFN_{mtrig}-T_{dif}/T_f)\text{mod}(256)$. In the illustrated example, since $CFN_c=100$, $CFN_{mtrig}=59$, $CFN_{cyc}=256$, $N_r=5$, $T_f=10$, and $T_{dif}=500$, $C_{mtrig}$ is larger than $C_{btrig}$, and hence $T_{mc}=(100-59+256\times(5-\text{floor}(500/10/256))\times10=13210$ (msec).

The base station apparatus 2 changes the HS-SCCH power offset at the setting change timing determined as describe above (step S106).

The mobile station apparatus 4 updates the HS-SCCH power offset at the setting change timing determined as describe above (step S304).

In the illustrated example, the difference between the time of reception of the communication cell addition notification at the base station apparatus 2 and the time of reception of the communication cell set update information at the mobile station apparatus 4 is $(59-10)\times10=490$ msec. On the other hand, the difference between the setting change timing determined by the mobile station apparatus 4 and the setting change timing determined by the base station apparatus 2 is also 490 msec ($=13700-13210$). It can therefore be seen that the mobile station apparatus 4 and the base station apparatus 2 can change the HS-SCCH power offset at the same time.

In the above process, the transmission of the Radio Link Addition Response message to the upper node apparatus 3 may be set as the trigger information for the base station apparatus 2, and the transmission of the communication cell update completion notification may be set as the trigger information for the mobile station apparatus 4.

Further, the reception of the Radio Link Deletion Request as a communication cell deletion notification may be set as the trigger information for the base station apparatus 2. In this case, the base station apparatus 2 receives the Radio Link Deletion Request after the mobile station apparatus 4 has received the Active Set Update as an action that provides a trigger. When the occurrence of the trigger action at the mobile station apparatus 4 precedes the occurrence of the trigger action at the base station apparatus 2 in this way, the mobile station apparatus 4 determines the setting change timing in accordance with equation (1), and the base station apparatus 2 determines the setting change timing in accordance with equation (2).

As an alternative example, the mobile communication system 1 may determine the setting change timing by utilizing the timing of hard handover execution. In this case, the setting change timing information included in the autonomous setting change information carries, instead of the specific timing, a specific number of occurrences of hard handover which is used as the reference. For example, when the first occurrence of hard handover is used as the reference, "1" is set in the setting change timing information. Alternatively, the most recent execution of hard handover may be specified as the reference in the setting change timing information. Then, the mobile station apparatus 4 and the base station apparatus 2 each use, instead of the specific timing, the CFN at the time of the execution of hard handover specified in the setting change timing information.

Figure 4:
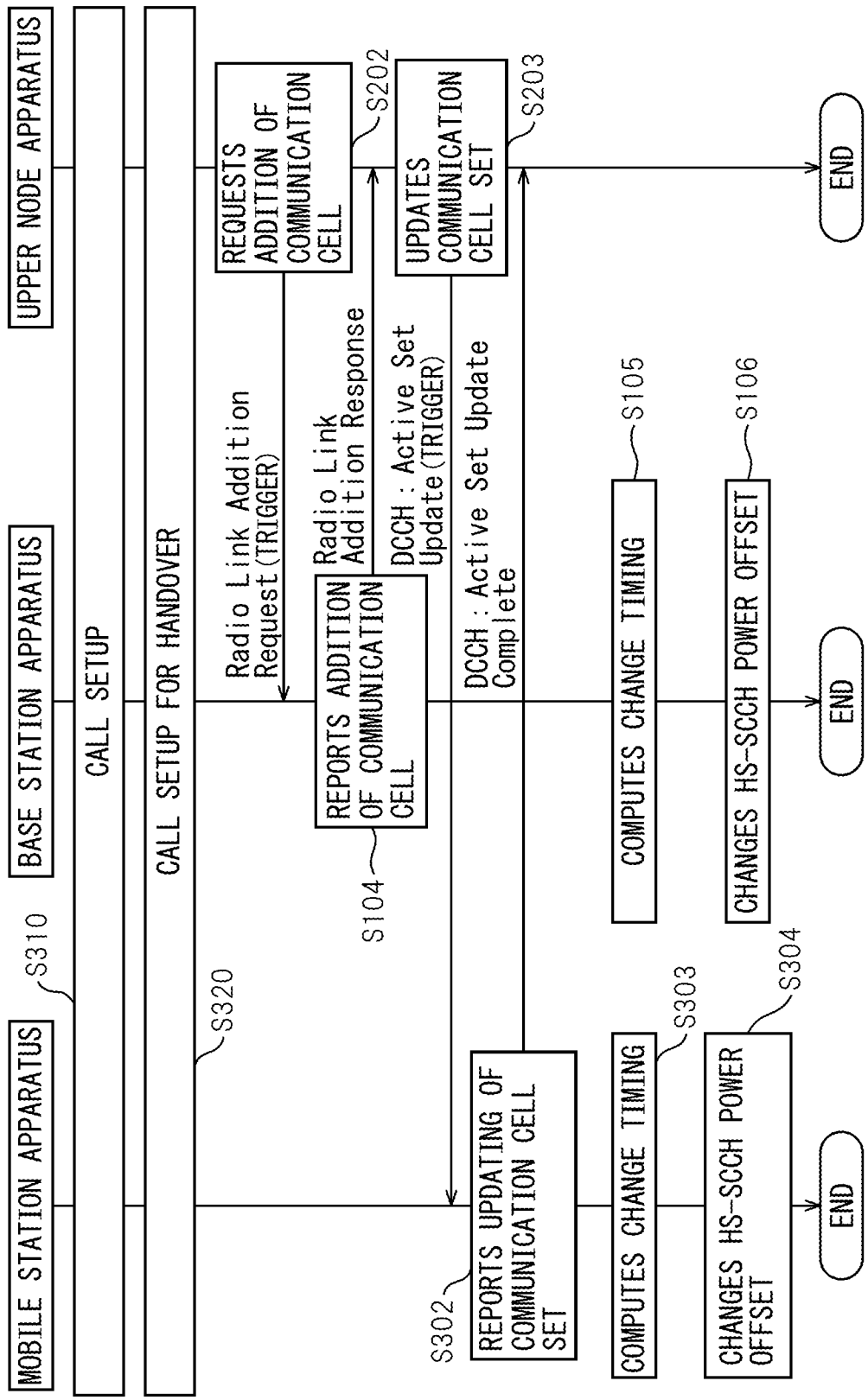
FIG. 4 is an operation sequence diagram illustrating another example of the setting change process.

FIG. 4 is a diagram illustrating, as another example, the operation sequence of the setup information changing process in which the setting change timing is determined by utilizing the hard handover execution timing. In this example also, the information whose setting is to be changed is the HS-SCCH transmit power offset, and the event that necessitates the setting change is the occurrence of a change in the number of communication cells for the mobile station apparatus 4.

In the operation sequence of FIG. 4, the same processing steps as those in the operation sequence of FIG. 3 are designated by the same reference numerals. It will also be noted that the steps S101 to S103 and S201 depicted in FIG. 3 are carried out prior to the step S310 depicted in the operation sequence of FIG. 4. The following describes only the differences from the operation sequence of FIG. 3.

When the mobile station apparatus 4 makes a request to initiate communication with some other communication terminal, or when some other communication terminal makes a request to initiate communication with the mobile station apparatus 4, call setup is performed between the mobile station apparatus 4 and the upper node apparatus 3 through the base station apparatus 2. Then, the connection between the mobile station apparatus 4 and the upper node apparatus 3 is established (step S310). The call setup here is performed, for example, in accordance with the call control defined in the 3GPP Release 99, and a stand-alone dedicated control channel (SDCCH) is set up between the mobile station apparatus 4 and the upper node apparatus 3.

After that, hard handover occurring at a specific number of times specified in the autonomous setting change information is executed (step S320). At this time, call setup is performed between the mobile station apparatus 4 and the upper node apparatus 3 in accordance with the HSDPA call control protocol. In this call setup process, the upper node apparatus 3 transmits the CFN designating the hard handover execution timing to the mobile station apparatus 4 via the SDCCH. The CFN designating the execution timing is specified by Activation Timing as defined, for example, in Radio Access Bearer Establishment procedures or the like. Further, the upper node apparatus 3 sends the CFN designating the hard handover execution timing to the base station apparatus 2 that is expected to be connected via radio to the mobile station apparatus 4 after the handover. The mobile station apparatus 4 and the base station apparatus 2 each store the CFN designating the hard handover execution timing.

Thereafter, the upper node apparatus 3 sends a communication cell add/delete command and communication cell set update information, each as a setting change trigger, to the base station apparatus 2 and the mobile station apparatus 4, respectively (steps S202 and S203).

Then, the base station apparatus 2 and the mobile station apparatus 4 each compute the setting change timing independently of each other (steps S105 and S303). The base station apparatus 2 and the mobile station apparatus 4 can compute the setting change timings $T_{bc}$ and $T_{mc}$ in accordance the earlier given equations (1) and (2), respectively, by substituting for $CFN_c$ the CFN designating the handover execution timing.

The base station apparatus 2 and the mobile station apparatus 4 each change the HS-SCCH power offset at the thus determining update timing (steps S106 and S304).

In the illustrated example, the number of setting change processes simultaneously performed at the base station apparatus can be reduced, since hard handover occurs on a per mobile station basis.

As another alternative example, the mobile communication system 1 may determine the setting change timing by using the CFN computed from the timing at which information is transmitted out on a downlink dedicated physical channel (DPCH). In this case, the setting change timing information included in the autonomous setting change information carries, instead of the specific timing, a code indicating that the transmit timing is used as the reference. In this case also, the base station apparatus 2 and the mobile station apparatus 4 can carry out the setting change process in accordance with the operation sequence of FIG. 3. Then, the ChipOffset that the upper node apparatus 3 sets in order to determine the timing for transmitting out the information on the DPCH in the call setup process depicted in step S301 of FIG. 3 is used to determine the setting change timing. Further, in steps S105 and S303 depicted in the operation sequence of FIG. 3, the base station apparatus 2 and the mobile station apparatus 4 determine the CFN of the setting change timing in the following manner.

In this case, for each communication call, the base station apparatus 2 and the mobile station apparatus 4 compute the CFN of the setting change timing in accordance with the following equation.

$$CFN_{ct} = \text{floor}(\text{ChipOffset}/150) \qquad (3)$$

where $CFN_{ct}$ is the CFN value of a tentatively determined setting change timing. ChipOffset is a per-chip offset value that is set for each mobile station apparatus, and takes one of the values that fall within the range of 0 to 38399. One frame contains 38400 chips. Further, floor(x) is a function that returns a maximum integer value not larger than the variable x.

ChipOffset may be given as a value obtained by combining the per-frame offset and the per-chip offset. When the value obtained by combining the per-frame offset and the per-chip offset is designated as $\text{ChipOffset}_{total}$ the mobile station apparatus 4 and the base station apparatus 2 each determine the value of ChipOffset to be substituted into the above equation (3) from the following equation.

$$\text{ChipOffset} = \text{ChipOffset}_{total} \bmod (38400) \quad (4)$$

Further, the CFN that provides the setting change timing is restricted to the timing that can be specified as the hard handover timing. The timing that can be specified needs to be the timing such that the transmit timing for every channel is the timing that provides an interleave break before and after the execution of hard handover. The transmission cycle of the signal transmitted over each channel differs from one channel to another. As a result, if the timing does not match the interleave break, then after the execution of the hard handover, the mobile station apparatus 4 may not be able to reproduce the signal received from any one of the channels, resulting in an inability to continue the communication.

In view of this, the mobile station apparatus 4 and the base station apparatus 2 each determine whether the $\text{CFN}_{ct}$ tentatively obtained as the setting change timing from equation (3) satisfies the above requirement for the hard handover. If the requirement for the hard handover is not satisfied, the mobile station apparatus 4 and the base station apparatus 2 correct the $\text{CFN}_{ct}$ value until the requirement is satisfied.

To determine whether the requirement for the hard handover is satisfied or not, the mobile station apparatus 4 and the base station apparatus 2 each determine the discrimination value in accordance with the following equation.

$$J_i = \text{CFN}_{ct} \bmod (t_i), i=1, 2, \ldots, n \quad (5)$$

where n represents the number of channels that the mobile station apparatus 4 uses to perform communication via the base station apparatus 2. Further, $t_i$ represents the interleave break for channel i. $\text{CFN}_{ct}$ is the CFN value computed from equations (3) and (4). $J_i$ is the discrimination value for channel i.

If the discrimination values for all the channels are 0, the mobile station apparatus 4 and the base station apparatus 2 each determine that the above requirement is satisfied. In this case, the mobile station apparatus 4 and the base station apparatus 2 each take the $\text{CFN}_{ct}$ value as the CFN vale designating the setting change timing.

On the other hand, if the discrimination value for any one of the channels is not 0, the mobile station apparatus 4 and the base station apparatus 2 each add a given value (for example, 1 or −1) to the $\text{CFN}_{ct}$ value. Then, using the thus corrected $\text{CFN}_{ct}$ value, the mobile station apparatus 4 and the base station apparatus 2 recalculate the discrimination value for each channel in accordance with equation (5) to determine whether the requirement is satisfied or not. The mobile station apparatus 4 and the base station apparatus 2 correct the $\text{CFN}_{ct}$ value until the requirement is satisfied. The given value, which is predetermined, may be stored in advance in both the mobile station apparatus 4 and the base station apparatus 2. Alternatively, the given value may be included in the autonomous setting change information, and the base station apparatus 2 may transmit this autonomous setting change information so that the mobile station apparatus 4 and the base station apparatus 2 can use the same given value.

One example of the processing performed when determining the setting change timing will be described below.

Suppose that $\text{ChipOffset}_{total}$ is set to 207360 in the call setup process. Also suppose that the number of channels that the mobile station apparatus 4 uses for communication is 3, and that the interleave breaks for these channels are 1, 2, and 4, respectively. Further suppose that the given value for correcting the $\text{CFN}_{ct}$ value is −1.

The mobile station apparatus 4 and the base station apparatus 2 calculate ChipOffset as 15360 by substituting $\text{ChipOffset}_{total}$ (=207360) into equation (4).

Then, the mobile station apparatus 4 and the base station apparatus 2 each obtain 102 as the $\text{CFN}_{ct}$ value by substituting the ChipOffset value into equation (3).

Next, the mobile station apparatus 4 and the base station apparatus 2 obtain the discrimination value for each channel by substituting the $\text{CFN}_{ct}$ value into equation (5). In this case, for the channel whose interleave break is 4, since the discrimination value is 2, the requirement is not satisfied.

As a result, the mobile station apparatus 4 and the base station apparatus 2 add the given value to the $\text{CFN}_{ct}$ value. Since the given value is −1, the corrected $\text{CFN}_{ct}$ value is 101. In this case, for the channels whose interleave breaks are 2 and 4, respectively, since the discrimination value is 1, the requirement is not satisfied. As a result, the mobile station apparatus 4 and the base station apparatus 2 again add the given value to the $\text{CFN}_{ct}$ value. The corrected $\text{CFN}_{ct}$ value is now 100. In this case, since the discrimination values for all the channels are 0, the requirement is satisfied. Accordingly, the mobile station apparatus 4 and the base station apparatus 2 each set the CFN value representing the setting change timing to 100.

Once the CFN value representing the setting change timing is thus determined, the base station apparatus 2 and the mobile station apparatus 4 can compute the setting change timings $T_{bc}$ and $T_{mc}$ in accordance the earlier given equations (1) and (2), respectively, by substituting the CFN value for $\text{CFN}_c$.

If there is more than one mobile station apparatus radio-linked to the base station apparatus 2, the base station apparatus 2 may select an appropriate setting change timing determining method for each mobile station apparatus from among the above three methods.

For example, the setting change timing determining method applicable to all the mobile station apparatuses radio-linked to the same base station apparatus may be selected. Alternatively, the setting change timing determining method applicable on a per-sector basis or a per-carrier (i.e., carrier frequency) basis may be selected for each base station apparatus. Further alternatively, the setting change timing determining method applicable on a per-cell basis, that is, for each radio link, may be selected.

FIG. 5 is a diagram illustrating an example of how the various setting change timing determining methods are selected for use. In FIG. 5, BTS1 to BTS3 indicated in fields 501 to 503 each designate one base station apparatus. Six sectors are set for each base station apparatus, and each column indicates one sector. Each base station apparatus uses four carriers, and each row indicates one carrier. Characters D, H, and C written in respective entries each indicate the setting change timing determining method employed. Character D indicates the method that specifies the specific timing as the setting change timing by the autonomous setting change information, character H indicates the method that determines the setting change timing based on hard handover, and character C indicates the method that determines the setting change timing based on ChipOffset.

As indicated in group 510, in the case of the base station apparatus BTS1, the method that specifies the specific timing by the autonomous setting change information is employed for all the mobile station apparatuses currently served in the sector 1. On the other hand, as indicated in group 511, the setting change timing determining method that differs for each radio link is employed for the respective mobile station apparatuses currently served in the sector 5. Further, as indicated in group 512, in the case of the base station apparatus BTS2, the method that specifies the specific timing by the autonomous setting change information is employed for all the mobile station apparatuses that communicate using the carrier 1. In the case of the base station apparatus BTS3, on the other hand, as indicated in group 513, the method that determines the setting change timing based on ChipOffset is employed for all the mobile station apparatuses currently served by the base station apparatus BTS3.

When more than one setting change timing determining method is used, the autonomous setting change information appropriate to each particular setting change timing determining method is stored in advance in the base station apparatus 2 along with information indicating the type of the setting change timing determining method. Then, when transmitting the autonomous setting change information by including it in the broadcast information to the mobile station apparatus 4, the base station apparatus 2 also transmits the information indicating the type of the setting change timing determining method by including it in the broadcast information. The mobile station apparatus 4 can identify which setting change timing determining method is employed, by retrieving the information indicating the type of the setting change timing determining method from the received broadcast information.

By thus using more than one setting change timing determining method, the base station apparatus 2 can stagger the setting change timing between the plurality of mobile station apparatuses 4 currently linked via radio to the base station apparatus 2. It this way, the processing load of the base station apparatus 2 associated with the setting change can be spread out in time.

Next, the amount of processing needed to accomplish the setting change process and the possibility of a setting change timing contention arising between the plurality of mobile station apparatuses will be described below.

The amount of processing is smallest with the method that specifies the specific timing by the autonomous setting change information, and largest with the method that determines the setting change timing based on ChipOffset. This is because, with the method that determines the setting change timing based on ChipOffset, not only the equation (1) but also the equations (3) to (5) have to be calculated, while on the other hand, with the method that specifies the specific timing by the autonomous setting change information, only the equation (1) need be calculated. On the other hand, with the method that determines the setting change timing based on hard handover, the base station apparatus need not calculate the equations (3) to (5), but the CFN at the time of the execution of hard handover occurring at a specific number of times specified in the autonomous setting change information has to be stored in the storage device of the base station apparatus. As a result, the amount of processing involved with the method that determines the setting change timing based on hard handover becomes larger than that of the method that specifies the specific timing by the autonomous setting change information, but is smaller than the amount of processing involved with the method that determines the setting change timing based on ChipOffset.

As for the contention of the setting change timing, the possibility of timing contention is smallest with the method that determines the setting change timing based on ChipOffset, and greatest with the method that specifies the specific timing by the autonomous setting change information. If the specific timing is specified in an identical manner, then when a trigger action (for example, a communication cell addition/deletion notification) occurs for a plurality of mobile station apparatuses at the same time, all such mobile station apparatuses will attempt to change the setting at the same time. By contrast, the value of ChipOffset is set by the upper node apparatus 3 differently for each mobile station apparatus so that the signal transmission timing differs from one mobile station apparatus to another. Accordingly, even in cases where the number of communication cells changes for a plurality of mobile station apparatuses at the same time, the timing to effect the setting change differs from one mobile station apparatus to another. On the other hand, with the method that determines the setting change timing based on hard handover, since the timing to effect the setting change is determined based on the hard handover execution timing, the possibility of contention of the setting change execution timing becomes greater as the amount of calls increases. As a result, with the method that determines the setting change timing based on hard handover, the possibility of timing contention is smaller than with the method that specifies the specific timing by the autonomous setting change information. However, with the method that determines the setting change timing based on hard handover, the possibility of timing contention is greater than with the method that determines the setting change timing based on ChipOffset.

In this way, the amount of processing and the possibility of execution timing contention differ according to the setting change timing determining method employed. In view of this, in default setting, the base station apparatus 2 employs the method that specifies the specific timing by the autonomous setting change information or the method that determines the setting change timing based on hard handover, for example, for a group where the possibility of contention of the setting change timing is small. On the other hand, for a group where the possibility of contention of the setting change timing is great, the base station apparatus 2 employs the method that determines the setting change timing based on ChipOffset or the method that determines the setting change timing based on hard handover. The base station apparatus can determine that the larger the amount of communication or the number of mobile station apparatuses currently served, the greater the possibility of contention of the setting change timing. Accordingly, for example, if it is expected that the number of mobile station apparatuses simultaneously connected to the base station apparatus 2 is small, the method that specifies the specific timing by the autonomous setting change information is employed for all the mobile station apparatuses. On the other hand, suppose that the number of mobile station apparatuses simultaneously connected increases in the order of the third sector, the second sector, and the first sector among the plurality of sectors served by the base station apparatus 2. In this case, the base station apparatus 2 may employ the method that determines the setting change timing based on ChipOffset, for example, for the mobile station apparatuses served in the first sector. On the other hand, for the mobile station apparatuses served in the second sector, the base station apparatus 2 may employ the method that determines the setting change timing based on hard handover. For the mobile station apparatuses served in the third sector, the base station apparatus 2 may employ the method that specifies the specific timing by the autonomous setting change information.

Further, the base station apparatus 2 may employ a method that calculates, on a prescribed unit basis, a statistical quantity (for example, average, mode, median, or maximum) related to the amount of communication or the number of connected mobile station apparatuses over a predetermined period of time, and that determines the setting change timing on the prescribed unit basis. The prescribed unit basis here refers, for example, to a per base station basis, a per sector basis, a per carrier basis, or a per cell basis. The predetermined period of time refers, for example, to the last one minute or one hour or to the same hour and minutes as the current hour and minutes in the past one week or one month.

In this case, if the statistical quantity related to the amount of communication or the number of connected mobile station apparatuses is smaller than a first threshold value indicating that the possibility of contention of the setting change timing is small, the base station apparatus 2 selects the method that specifies the specific timing by the autonomous setting change information. On the other hand, if the statistical quantity related to the amount of communication or the number of connected mobile station apparatuses is equal to or larger than a second threshold value indicating that the possibility of contention of the setting change timing is great, the base station apparatus 2 selects the method that determines the setting change timing based on ChipOffset. If the statistical quantity related to the amount of calls or the number of connected mobile station apparatuses is not smaller than the first threshold value but smaller than the second threshold value, the base station apparatus 2 selects the method that determines the setting change timing based on hard handover.

If the setting change timing determining method is different for each different cell currently serving the mobile station apparatus, the setting change timing determining method employed in one of the cells is selected for use. For example, when a new communication cell is added, the setting change timing determining method employed in the current communication cell is selected for use.

Further, the base station apparatus 2 and the mobile station apparatus 4 linked via radio to the base station apparatus 2 may select an appropriate setting change timing determining method according to the communication conditions or communication performance of the mobile station apparatus 4. The setting change timing determining method to be employed is selected according to whether the mobile station apparatus 4 complies with HSDPA or with Enhanced Uplink (EUL) and, when it complies with HSDPA or EUL, then according to the category to which the reception performance and transmission performance of the mobile station apparatus 4 belongs. Alternatively, the setting change timing determining method to be employed may be selected based on the number of hard handovers performed by the mobile station apparatus 4 during a session or on the number of communication cells.

For example, when the mobile station apparatus 4 radio-liked to it does not comply with EUL, the base station apparatus 2 may employ the method that specifies the specific timing by the autonomous setting change information. On the other hand, when the mobile station apparatus 4 radio-liked to it complies with EUL, and when the category of the transmission performance is odd-numbered, the base station apparatus 2 may employ the method that determines the setting change timing based on hard handover. When the mobile station apparatus 4 radio-liked to it complies with EUL, and when the category of the transmission performance is even-numbered, the base station apparatus 2 may employ the method that determines the setting change timing based on ChipOffset.

Further, when the category of the reception performance of the mobile station apparatus 4 radio-liked to it falls within the range of 1 to 6, the base station apparatus 2 may employ the method that determines the setting change timing based on ChipOffset. When the category of the reception performance of the mobile station apparatus 4 radio-liked to it falls within the range of 7 to 10, the base station apparatus 2 may employ the method that determines the setting change timing based on hard handover.

Further, if no hard handover has been performed during the session, the base station apparatus 2 may employ the method that specifies the specific timing by the autonomous setting change information. On the other hand, if hard handover has been executed an odd number of times, the base station apparatus 2 may employ the method that determines the setting change timing based on hard handover, and if hard handover has been executed an even number of times, the base station apparatus 2 may employ the method that determines the setting change timing based on ChipOffset.

Further, if the number of communication cells for the mobile station apparatus 4 radio-liked to it is 1, the base station apparatus 2 may employ the method that specifies the specific timing by the autonomous setting change information. If the number of communication cells for the mobile station apparatus 4 is 2, the base station apparatus 2 may employ the method that determines the setting change timing based on hard handover, and if the number of communication cells for the mobile station apparatus 4 is 3, the base station apparatus 2 may employ the method that determines the setting change timing based on ChipOffset.

When the base station apparatus 2 and the mobile station apparatus 4 select an appropriate setting change timing determining method according to the communication conditions or communication performance of the mobile station apparatus 4, the autonomous setting change information includes, for example, a code indicating each communication condition or communication performance and the setting change timing information corresponding to it. Then, when an action defined in the trigger information included in the autonomous setting change information has occurred, the base station apparatus 2 and the mobile station apparatus 4 refer to the autonomous setting change information and identify the setting change timing information corresponding to the communication condition or communication performance of the mobile station apparatus 4 at the time of occurrence of the action.

If a fault occurs in the base station apparatus 2 or the mobile station apparatus 4 during the execution of a series of operations in the setting change process, the mobile communication system 1 aborts the setting change process. For example, suppose that the trigger action for the base station apparatus 2 is the reception of a communication cell add command from the upper node apparatus 3, and that the trigger action for the mobile station apparatus 4 is the reception of communication cell set update information from the upper node apparatus 3. Then, suppose that a fault occurs in the base station apparatus 2 during the period of time from the moment when the communication cell add command (Radio Link Addition Request) is received by the base station apparatus 2 until the mobile station apparatus 4 receives the communication cell set update information (Active Set Update). In this case, the base station apparatus 2 notifies the upper node apparatus 3 of the occurrence of the fault. Then, the base station apparatus 2 resets the setting concerning the number of communication cells. The upper node apparatus 3 holds off transmitting the communication cell add command to the mobile station apparatus 4. The mobile communication system 1 can thus prevent setting mismatches from occurring between the upper node apparatus 3, the base station apparatus 2, and the mobile station apparatus 4.

Next, a description will be given of the processing performed to abort the setting change process when a fault occurs before effecting the setting change in the base station apparatus 2 or the mobile station apparatus 4, whichever one in which the action that triggered the setting change occurred later than in the other.

Figure 6:
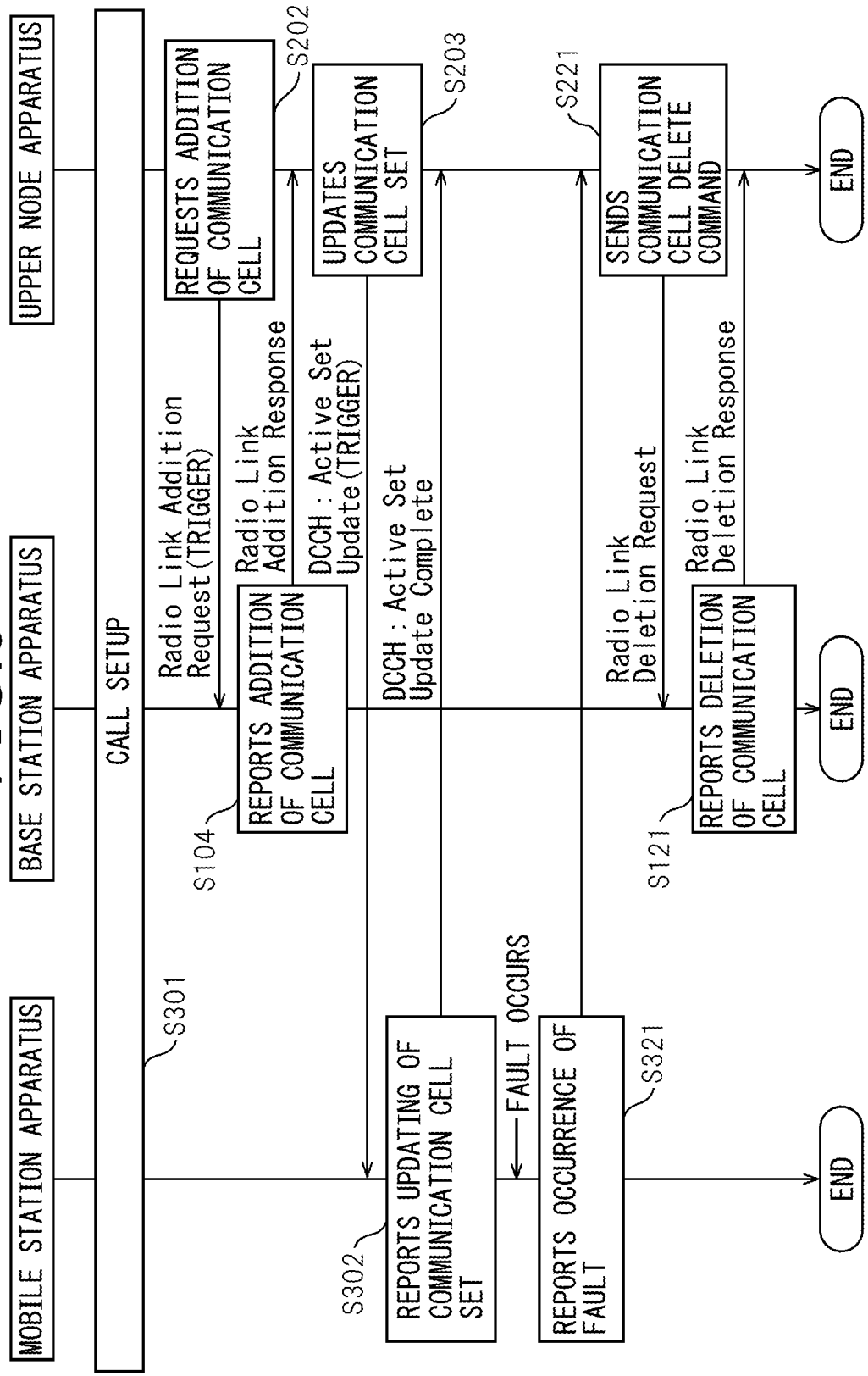
FIG. 6 is an operation sequence diagram illustrating one example of a setting change aborting process.

FIG. 6 is an operation sequence diagram illustrating one example of the processing performed to abort the setting change process. In the operation sequence of FIG. 6, the same processing steps as those in the operation sequence of FIG. 3 are designated by the same reference numerals. It will also be noted that the steps S101 to S103 and S201 depicted in FIG. 3 are carried out prior to the step S301 depicted in the operation sequence of FIG. 6. The following describes only the differences from the operation sequence of FIG. 3.

Call setup is performed between the base station apparatus 2, the upper node apparatus 3, and the mobile station apparatus 4 (step S301), and after that, as a new communication cell is added for the mobile station apparatus 4, the processing steps S202, S203, S104, and S302 are carried out. Suppose that a fault occurs in the mobile station apparatus 4 after the mobile station apparatus 4 notified the upper node apparatus 3 of the completion of the communication cell set update in step S302. In this case, the mobile station apparatus 4 does not proceed to the step of changing the HS-SCCH transmit power offset (step S304 in FIG. 3). Instead, the mobile station apparatus 4 notifies the upper node apparatus 3 of the occurrence of a fault in accordance, for example, with the RRC protocol (step S321). In response, the upper node apparatus 3 sends a command for deleting the communication cell added in the processing steps S202 and S104 (for example, Radio Link Deletion Request defined in the NBAP protocol) to the base station apparatus 2 (step S221). The base station apparatus 2 that received the communication cell delete command deletes the last added communication cell. Then, the base station apparatus 2 sends a message reporting the deletion of the communication cell (for example, Radio Link Deletion Response defined in the NBAP protocol) to the upper node apparatus 3 (step S121). Thereupon, the setting of each apparatus in the mobile communication system 1 is brought back to the state maintained before step S202, and the setting change process in both the base station apparatus 2 and the mobile station apparatus 4 is aborted. This prevents setting mismatches from occurring between the base station apparatus 2 and the mobile station apparatus 4, and allows the mobile station apparatus 4 to continue the communication.

On the other hand, if a fault occurs when the base station apparatus 2 or the mobile station apparatus 4 is in the process of changing the setting or after the setting has been changed, the mobile communication system 1 first disconnects the links between the respective apparatuses and thereafter initiates a reconnection procedure.

Figure 7:
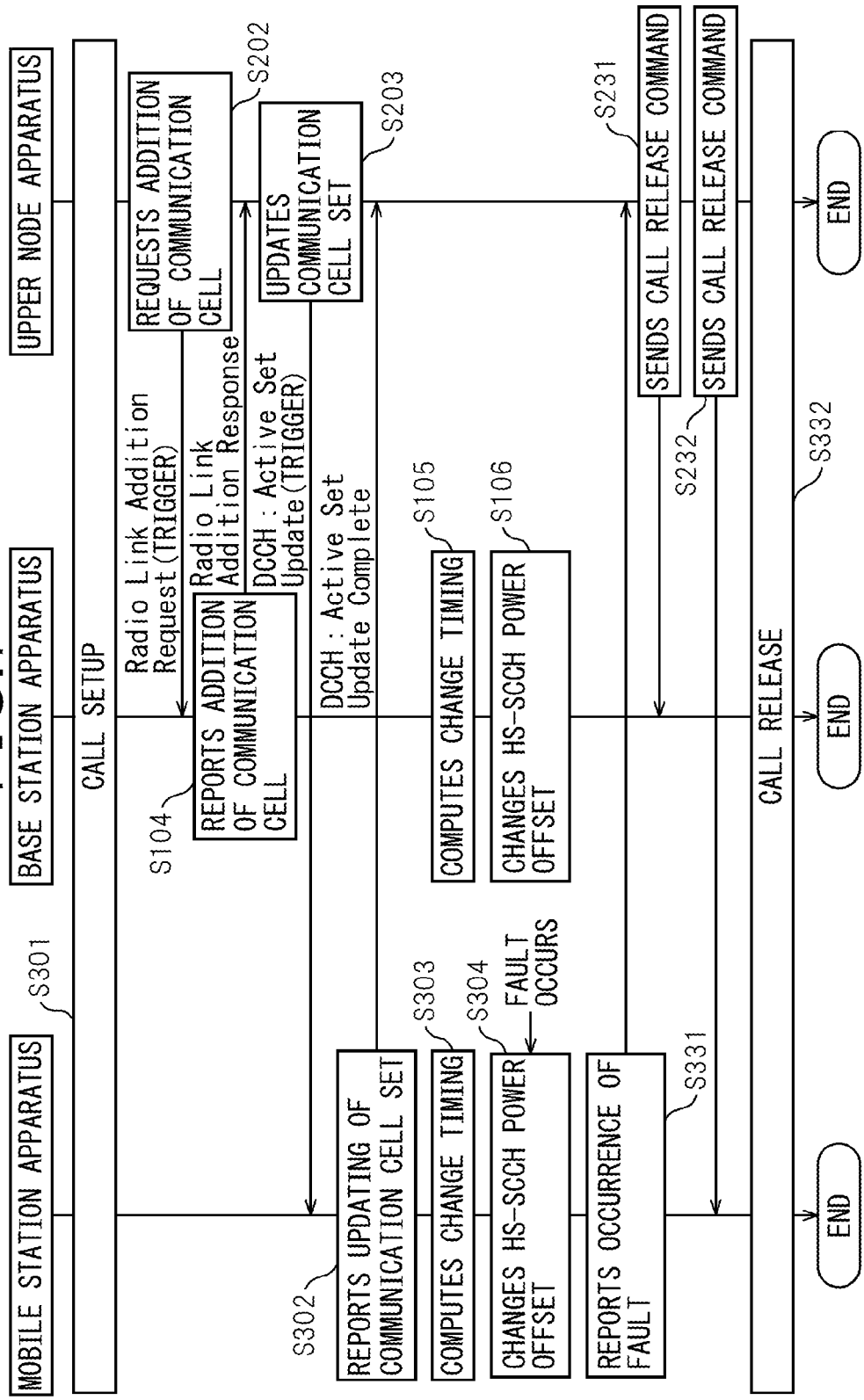
FIG. 7 is an operation sequence diagram illustrating one example of a disconnection process.

FIG. 7 is an operation sequence diagram illustrating one example of such a disconnection process. In the operation sequence of FIG. 7, the same processing steps as those in the operation sequence of FIG. 3 are designated by the same reference numerals. It will also be noted that the steps S101 to S103 and S201 depicted in FIG. 3 are carried out prior to the step S301 depicted in the operation sequence of FIG. 7. The following describes only the differences from the operation sequence of FIG. 3.

Call setup is performed between the base station apparatus 2, the upper node apparatus 3, and the mobile station apparatus 4 (step S301), and after that, as a new communication cell is added for the mobile station apparatus 4, the processing steps S202, S203, S104, and S302 are carried out. Further, the base station apparatus 2 proceeds to steps S105 and S106 and changes the HS-SCCH transmit power offset value accordingly. The mobile station apparatus 4 proceeds to step S303 to determine the setting change timing so that it can change the HS-SCCH transmit power offset value in synchronized fashion with the base station apparatus 2. Suppose that a fault occurs when the mobile station apparatus 4 is in the process of changing the HS-SCCH transmit power offset value in step S304.

The mobile station apparatus 4 then notifies the upper node apparatus 3 of the occurrence of a fault in accordance, for example, with the RRC protocol (step S331). In response, the upper node apparatus 3 sends a call release command to the base station apparatus 2 in accordance with the NBAP protocol (step S231). The upper node apparatus 3 also sends a call release command to the mobile station apparatus 4 in accordance with the RRC protocol (step S232). The order of steps S231 and S232 may be interchanged.

After that, the base station apparatus 2, the upper node apparatus 3, and the mobile station apparatus 4 perform a call release procedure (step S332). Then, after a prescribed period of time has elapsed, the base station apparatus 2, the upper node apparatus 3, and the mobile station apparatus 4 may perform the call setup procedure once again.

The configuration of each component element of the mobile communication system 1 will be described in detail below.

Figure 8:
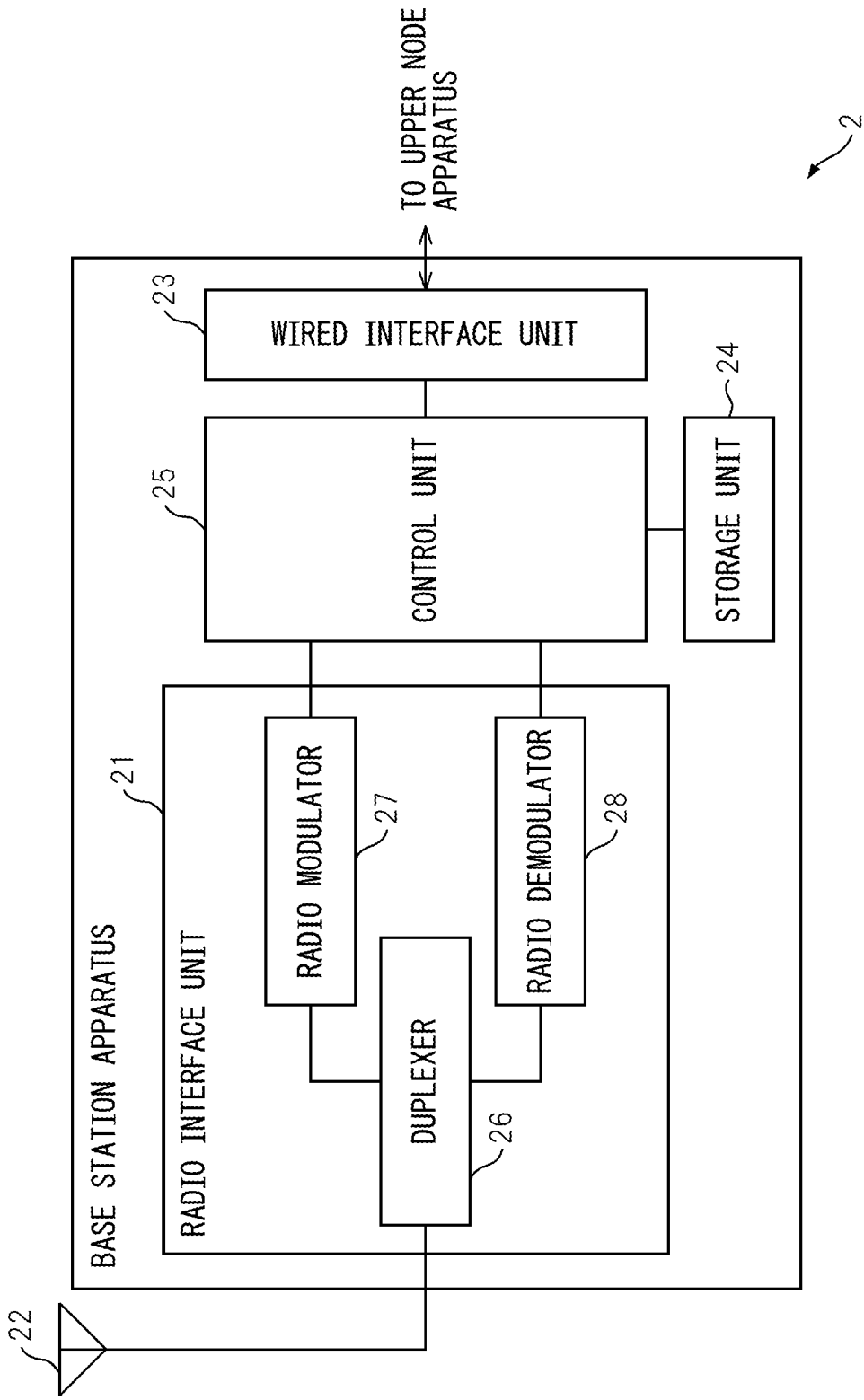
FIG. 8 is a diagram schematically illustrating the configuration of a base station apparatus.

FIG. 8 is a diagram schematically illustrating the configuration of the base station apparatus 2. The base station apparatus 2 includes a radio interface unit 21, an antenna 22, a wired interface unit 23, a storage unit 24, and a control unit 25. The radio interface unit 21 includes a duplexer 26, a radio modulator 27, and a radio demodulator 28. The radio interface unit 21, the storage unit 24, and the control unit 25 are implemented as separate circuits. Alternatively, these units may be mounted on the base station apparatus 2 by implementing them in the form of a single integrated circuit on which the circuits corresponding to the respective units are integrated.

The radio modulator 27 in the radio interface unit 21 receives from the control unit 25 various kinds of control signals and the downlink signal processed for transmission, and modulates these signal in accordance with a prescribed modulation scheme. The prescribed modulation scheme here is for example, Quadrature Phase Shift Keying (QPSK) or 16-Quadrature Amplitude Modulation (16QAM). The radio modulator 27 superimposes each of the thus modulated downlink signal and control signals onto a carrier having a radio frequency. The autonomous setting change information is included, for example, in the broadcast information and carried as part of the control signals. Then, the radio modulator 27 amplifies the downlink signal and control signals, each superimposed on a carrier, to a desired level by a high-power amplifier (not depicted), and passes them via the duplexer 26 to the antenna 22 for transmission to the mobile station apparatus 4.

On the other hand, the uplink signal and control signals received by the antenna 22 are passed via the duplexer 26 to the radio demodulator 28 in the radio interface unit 21 and are amplified by a low-noise amplifier (not depicted). The radio demodulator 28 multiplies the thus amplified uplink signal and control signals by a periodic signal having an intermediate frequency and thereby converts the frequency of the uplink signal and control signals from the radio frequency to the baseband frequency. Then, the radio demodulator 28 demodulates the uplink signal in accordance with a prescribed modulation scheme. The radio demodulator 28 then passes the demodulated uplink signal and control signals to the control unit 25.

The downlink signal or control signals passed from the radio modulator 27 via the duplexer 26 are radiated from the antenna 22. On the other hand, the uplink signal or various kinds of control signals transmitted from the mobile station apparatus 4 are received by the antenna 22 and passed via the duplexer 26 to the radio demodulator 28.

The wired interface unit 23 includes a communication interface for establishing a connection with the upper node apparatus 3. The wired interface unit 23 receives the downlink signal or control signals from the upper node apparatus 3 and passes the downlink signal or control signals to the control unit 25. Further, the wired interface unit 23 receives the uplink signal or control signals from the control unit 25 and transmits the uplink signal or control signals to the upper node apparatus 3.

The storage unit 24 includes, for example, an alterable nonvolatile semiconductor memory. The storage unit 24 stores various kinds of information, such as identification information of the base station apparatus 2 and the frequencies used, that are used for controlling the radio connection with the mobile station terminal 4. The storage unit 24 may also be used to temporarily store the uplink signal or the downlink signal.

The storage unit 24 further stores the autonomous setting change information.

The control unit 25 includes, for example, one or a plurality of processors and their peripheral circuitry. The control unit 25 applies transmission processing, such as channel multiplexing and spreading, to the downlink signal received via the wired interface unit 23 for transmission to the mobile station terminal 4. The control unit 25 passes the thus processed downlink signal to the radio modulator 27. The control unit 25 also retrieves the autonomous setting change information from the storage unit 24 and passes it to the radio modulator 27 by including it, for example, in the broadcast information. Further, the control unit 25 receives the uplink signal transmitted from the mobile station apparatus 4 and demodulated by the radio demodulator 28, and applies reception processing, such as despreading and channel demultiplexing, to the received signal. The control unit 25 passes the demodulated uplink signal to the wired interface unit 23.

The control unit 25, in response to the control command received from the upper node apparatus 3, performs processing such as call setup, call release, etc. in accordance with a call control protocol such as NBAP or other control protocol. Further, the control unit 25 performs processing such as transmit power control.

Further, by referring to the autonomous setting change information retrieved from the storage unit 24, the control unit 25 performs the setting change process as earlier described. That is, by referring to the trigger information, the control unit 25 determines whether any trigger action has occurred or not. In the event a trigger action, the control unit 25 determines the setting change timing based on the setting change timing information and the trigger time difference information. When the setting change timing is reached, the control unit 25 changes the designated setting in accordance with the setup information included in the autonomous setting change information.

Figure 9:
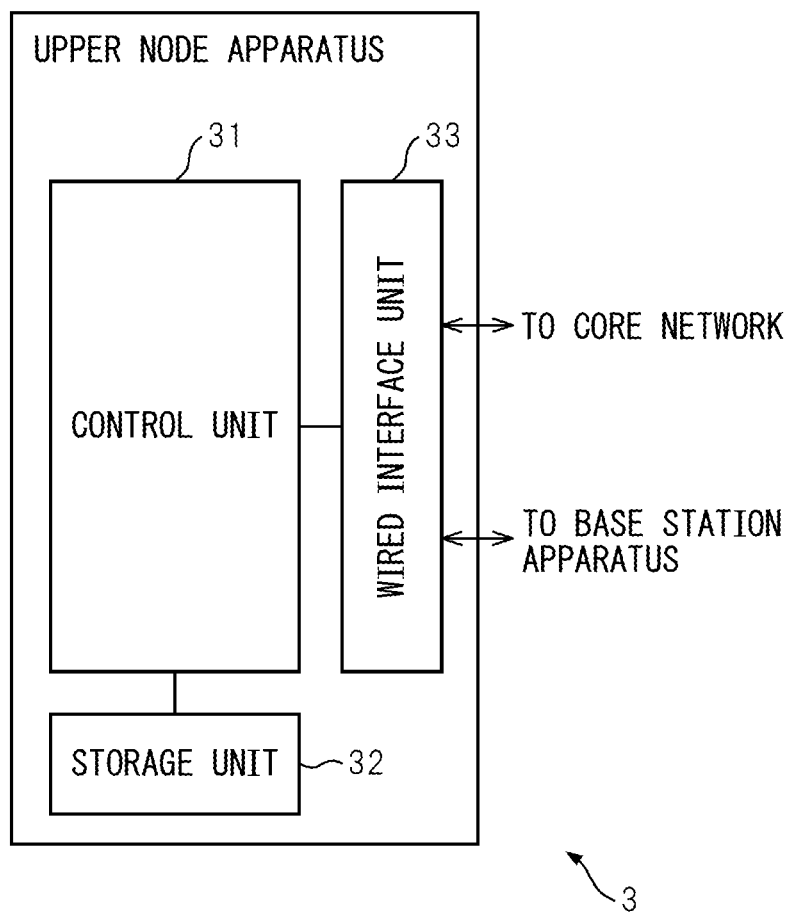
FIG. 9 is a diagram schematically illustrating the configuration of an upper node apparatus.

FIG. 9 is a diagram schematically illustrating the configuration of the upper node apparatus 3. The upper node apparatus 3 includes a control unit 31, a storage unit 32, and a wired interface unit 33.

The control unit 31 includes, for example, one or a plurality of processors and their peripheral circuitry. The control unit 31 has the function of supervising the location and condition of each mobile station apparatus located within the communication area served by any one of the base station apparatuses connected to the upper node apparatus 3. Further, the control unit 31 performs routing for the signal received from the communicating mobile station apparatus 4. For example, the control unit 31 passes the uplink signal, received from the communicating mobile station apparatus 4, to the wired interface unit 33 which then transmits out the signal on the core network. On the other hand, when a downlink signal addressed to the communicating mobile station apparatus 4 is received from the core network via the wired interface unit 33, the control unit 31 transmits the downlink signal via the wired interface unit 33 to the base station apparatus to which the mobile station apparatus is linked via radio.

The control unit 31 includes the functions of Radio Resource Control (RRC) and Radio Resource Management (RRM). Then, in accordance with a prescribed call control protocol, the control unit 31 performs processing, such as call control and handover, for the mobile station apparatus 4 entering the communication area of the base station apparatus 2 in order to establish a radio connection between the base station apparatus 2 and the mobile station apparatus 4. The control unit 31 also performs communication cell management and update processing for the mobile station apparatus 4 radio-linked to the base station apparatus 2.

The control unit 31 may further include the functions of Radio Link Control (RLC) and Media Access Control (MAC). Then, the control unit 31 may perform processing, such as retransmission control and reordering, for transmission and reception of signals to and from the mobile station apparatus 4.

Further, if the autonomous setting change information for the base station apparatus 2 connected to the upper node apparatus 3 is stored in the storage unit 32, the control unit 31 may transmit the corresponding autonomous setting change information to the base station apparatus 2 upon receiving a power-on notification message from the base station apparatus 2.

The storage unit 32 includes, for example, an alterable nonvolatile semiconductor memory. The storage unit 32 stores various kinds of information used to perform control to communicate with the mobile station apparatus radio-linked to any one of the base station apparatuses connected to the upper node apparatus 3. The storage unit 32 may also store, along with the identification information of each base station apparatus connected to the upper node apparatus 3, the autonomous setting change information for that base station apparatus.

The wired interface unit 33 includes a communication interface for connecting the upper node apparatus 3 to the core network or to any one of the base station apparatuses. The wired interface unit 33 receives from the core network the downlink signal addressed to the mobile station apparatus 4 radio-linked to the base station apparatus 2 connected to the upper node apparatus 3, and passes the downlink signal to the control unit 31. Further, when the downlink signal is received from the control unit 31, the wired interface unit 33 transmits the downlink signal to the base station apparatus to which the destination mobile station apparatus of the downlink signal is linked via radio. On the other hand, when an uplink signal is received from the base station apparatus 2, the wired interface unit 33 passes the uplink signal to the control unit 31. Further, when the uplink signal is received from the control unit 33, the wired interface unit 33 transmits out the uplink signal on the core network.

Figure 10:
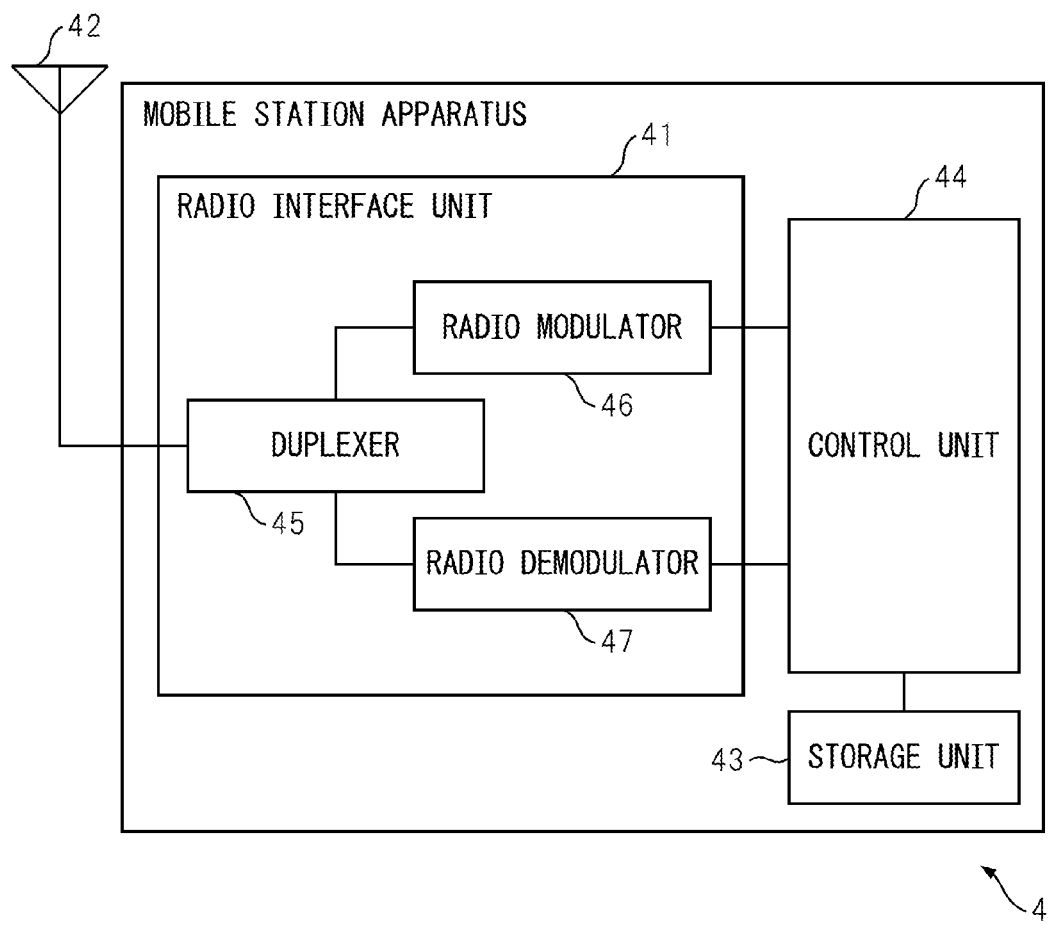
FIG. 10 is a diagram schematically illustrating the configuration of a mobile station apparatus.

FIG. 10 is a diagram schematically illustrating the configuration of the mobile station apparatus 4. The mobile station apparatus 4 includes a radio interface unit 41, an antenna 42, a storage unit 43, and a control unit 44. The radio interface unit 41 includes a duplexer 45, a radio modulator 46, and a radio demodulator 47. The radio interface unit 41, the storage unit 43, and the control unit 44 are implemented as separate circuits. Alternatively, these units may be mounted on the mobile station apparatus 4 by implementing them in the form of a single integrated circuit on which the circuits corresponding to the respective units are integrated.

The radio interface unit 41 and antenna 42 depicted here are identical in function and configuration to the radio interface unit 21 and antenna 22 of the base station apparatus 2 depicted in FIG. 8. Therefore, a detailed description of the radio interface unit 41 and antenna 42 will not be given herein.

The storage unit 43 includes, for example, an alterable nonvolatile semiconductor memory. The storage unit 43 stores various kinds of information used to perform control to communicate with the base station apparatus 2. The storage unit 32 also stores the autonomous setting change information received from the base station apparatus 2.

The control unit 44 performs processing, such as location registration, call control, and handover, for establishing a radio connection between the mobile station apparatus 4 and the base station apparatus. For this purpose, the control unit 44 generates a control signal used for establishing a radio connection between the mobile station apparatus 4 and the base station apparatus, and passes the control signal to the radio modulator 46. Further, the control unit 44 performs processing according to a control signal received from the base station apparatus 2.

Further, the control unit 44 creates an uplink signal which includes a voice signal or data signal acquired via a microphone (not depicted) or via a user interface such as a keypad (not depicted). Then, the control unit 44 applies transmission processing, such as information source coding, error-correction coding, channel multiplexing, and spreading, to the uplink signal. The control unit 44 passes the thus processed uplink signal to the radio modulator 46. Further, the control unit 25 receives the downlink signal transmitted via radio from the serving base station apparatus 2 and demodulated by the radio demodulator 28, and applies reception processing, such as despreading, channel demultiplexing, error-correction decoding, and information source decoding, to the received signal. Then, the control unit 44 recovers the voice signal or data signal from the decoded downlink signal. The control unit 44 reproduces the recovered voice signal through a speaker (not depicted) or displays the data signal on a display (not depicted).

Further, the control unit 44 retrieves the autonomous setting change information from the control information received by the antenna 42 from the base station apparatus 2 and passed via the radio interface unit 41, and stores the autonomous setting change information in the storage unit 43. Then, by referring to the autonomous setting change information retrieved from the storage unit 43, the control unit 44 performs the setting change process as earlier described. That is, the control unit 44 determines the setting change timing for effecting the setting change in accordance with the setting change timing determining method specified in the autonomous setting change information. Further, by referring to the trigger information, the control unit 44 determines whether any trigger action has occurred or not. In the event of occurrence of a trigger action, the control unit 44 determines the setting change timing based on the setting change timing information and the trigger time difference information. When the setting change timing is reached, the control unit 44 changes the designated setting in accordance with the setup information included in the autonomous setting change information.

As described above, in the mobile communication system disclosed herein, the autonomous setting change information, which includes the information after a setting change is made and indicates the setting change timing computed based on a prescribed trigger, is stored in advance in the base station apparatus for each event that may require that the base station apparatus and mobile station apparatus change the setting in synchronized fashion. The base station apparatus includes the autonomous setting change information in the control information such as the broadcast information periodically transmitted to each mobile station apparatus located within the communication area of the base station apparatus. The mobile station apparatus retrieves the autonomous setting change information from the control information received from the base station apparatus. When the occurrence of a trigger action is detected, the base station apparatus and the mobile station apparatus autonomously determine the timing for changing the setup information by referring to the autonomous setting change information, and change the setup information at the thus determined timing. As a result, in the mobile communication system disclosed herein, if an event necessitating changing the setup information occurs, signals for changing the setup information need not be transferred back and forth between the respective apparatuses. In this way, the mobile communication system can reduce the amount of communication that occurs between the respective apparatuses when changing the setup information.

According to an alternative embodiment, the specific timing specified in the autonomous setting change information or determined based on the execution of hard handover or on ChipOffset may be one that indicates the timing that both the mobile station apparatus and the base station apparatus are allowed to know. The specific timing may be specified, for example, by the system frame number. Further, when the base station apparatus and the mobile station apparatus can each estimate the time difference between the trigger actions occurring in the base station apparatus and the mobile station apparatus, respectively, the autonomous setting change information may not need to include the trigger time difference information.

According to a further alternative embodiment, the CFN specified by Activation Timing that specifies the execution timing for changing the modulation method that the base station apparatus or the mobile station apparatus uses for signal transmission may be used instead of the specific timing.

Further, the event in response to which the base station apparatus and the mobile station apparatus change the setting by using the autonomous setting change information may be the changing of the modulation method that the base station apparatus or the mobile station apparatus uses for signal transmission. In this case, the reception by the base station apparatus or the mobile station apparatus of the control information concerning the changing of the modulation method can be used as the trigger action.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A mobile communication system comprising a base station apparatus and a mobile station apparatus, wherein
the base station apparatus stores setting change information which includes setup information that is changed in accordance with a first event when the first event occurs, timing information that specifies a timing for making a setting change, and trigger information that specifies an action based on which the base station apparatus and the mobile station apparatus compute the setting change timing for the base station apparatus and the mobile station apparatus, respectively; and
transmits, in advance of occurrence of the first event, the setting change information to the mobile station apparatus located within a communication area served by the base station apparatus, and
when the action specified in the trigger information occurs, the mobile station apparatus and the base station apparatus each determine the setting change timing in accordance with the timing information included in the setting change information and effect the setting change at the determined timing in accordance with the setup information included in the setting change information.

2. The mobile communication system according to claim 1, wherein the mobile station apparatus and the base station apparatus each determine the setting change timing so that the setting change is effected simultaneously between the mobile station apparatus and the base station apparatus.

3. The mobile communication system according to claim 1, wherein the timing information includes frame number information that indicates a specific frame number in a sequence of frame numbers repeated in a predetermined cycle, the frame numbers being appended to frames to be transmitted from the base station apparatus to the mobile station apparatus, the timing information further including information indicating the number of repetitions of the cycle that is repeated after occurrence of the action, and wherein
the mobile station apparatus and the base station apparatus each determine, as the setting change timing, a timing corresponding to the frame of the specific frame number that occurs after the frame number cycle has been repeated a number of times equal to the number of repetitions after the occurrence of the action specified in the trigger information.

4. The mobile communication system according to claim 3, wherein the setting change information further includes time difference information that indicates an estimate of a time difference existing between the time of occurrence of the action in the mobile station apparatus and the time of occurrence of the action in the base station apparatus, and
between the mobile station apparatus and the base station apparatus, the apparatus in which the action occurs later than in the other apparatus estimates, from the number of frames corresponding the estimate of the time difference indicated by the time difference information, the frame number corresponding to the time of occurrence of the action in the other apparatus in which the action occurs earlier, and wherein when the frame number at the time of occurrence of the action in the apparatus in which the action occurs later is smaller than the estimated frame number, correction is made so as to reduce the number of repetitions by one, and when the number of frames corresponding the estimate of the time difference indicated by the time difference information exceeds a maximum value limiting the number of frames, correction is made so as to reduce the number of repetitions in accordance with the time difference.

5. The mobile communication system according to claim 3, wherein the frame number information specifies a timing for executing a second event which is different from the first event, and the mobile station apparatus and the base station apparatus each take as the specific frame number the frame number at the time of the execution of the second event.

6. The mobile communication system according to claim 5, wherein the second event is a specific number of occurrences of hard handover during a session.

7. The mobile communication system according to claim 3, further comprising an upper node apparatus which is connected to the base station apparatus, wherein
the frame number information specifies a timing for transmitting a signal to the mobile station apparatus designated by the upper node apparatus, and
the mobile station apparatus and the base station apparatus each take as the specific frame number the frame number computed from a per-chip offset value that defines the timing for transmitting the signal to the mobile station apparatus.

8. The mobile communication system according to claim 3, wherein when the amount of communication for a first group of mobile station apparatuses connected via radio to the base station apparatus or the number of mobile station apparatuses in the first group is larger than the amount of communication for a second group of mobile station apparatuses connected via radio to the base station apparatus or the number of mobile station apparatuses in the second group, the base station apparatus determines the setting change timing for the first group by using as the specific frame number the frame number computed from a per-chip offset value that defines a timing for transmitting a signal to the mobile station apparatus designated by an upper node apparatus connected to the base station apparatus, or the frame number at the time of execution of hard handover occurring at a specific number of times during a session, and determines the setting change timing for the second group by using the specific frame number specified in the frame number information.

9. The mobile communication system according to claim 8, wherein the first group is a group of mobile station apparatuses connected to a first sector served by the base station apparatus, and the second group is a group of mobile station apparatuses connected to a second sector served by the base station apparatus but different from the first sector.

10. The mobile communication system according to claim 8, wherein the first group is a group of mobile station apparatuses connected by using a carrier wave having a first wavelength, and the second group is a group of mobile station apparatuses connected by using a carrier wave having a second wavelength which is different from the first wavelength.

11. The mobile communication system according to claim 3, wherein when the amount of communication for a first group of mobile station apparatuses connected via radio to the base station apparatus or the number of mobile station apparatuses in the first group is larger than the amount of communication for a second group of mobile station apparatuses connected via radio to the base station apparatus or the number of mobile station apparatuses in the second group, the base station apparatus determines the setting change timing for the first group by using as the specific frame number the frame number computed from a per-chip offset value that defines a timing for transmitting a signal to the mobile station apparatus designated by an upper node apparatus connected to the base station apparatus, and determines the setting change timing for the second group by using as the specific frame number the frame number at the time of execution of hard handover occurring at a specific number of times during a session.

12. The mobile communication system according to claim 3, wherein the base station apparatus and the mobile station apparatus each determine the setting change timing by selecting one of the following methods according to communication conditions or communication performance of the mobile station apparatus: (a) a method that determines the setting change timing by using as the specific frame number the frame number computed from a per-chip offset value that defines a timing for transmitting a signal to the mobile station apparatus designated by an upper node apparatus connected to the base station apparatus; (b) a method that determines the setting change timing by using as the specific frame number the frame number at the time of execution of hard handover occurring at a specific number of times during a session; and (c) a method that determines the setting change timing by using the specific frame number specified in the frame number information.

13. The mobile communication system according to claim 1, wherein the first event is a change in the number of communication cells for the mobile station apparatus, and the action specified in the trigger information for the base station apparatus and the mobile station apparatus, respectively, is a notification relating to a change in the number of communication cells.

14. A base station apparatus comprising:
a storage unit which stores setting change information which includes setup information that is changed in accordance with a prescribed event when the prescribed event occurs, timing information that specifies a timing for making a setting change, and trigger information that specifies an action based on which the base station apparatus and a mobile station apparatus compute the setting change timing for the base station apparatus and the mobile station apparatus, respectively;
a radio interface unit which transmits, in advance of occurrence of the prescribed event, the setting change information to the mobile station apparatus located within a communication area served by the base station apparatus; and
a control unit which, when the action specified in the trigger information occurs, determines the setting change timing in accordance with the timing information included in the setting change information, and effects the setting change at the determined timing in accordance with the setup information included in the setting change information.

15. A mobile station apparatus comprising:
a radio interface unit which receives, from a base station apparatus, setting change information which includes setup information that is changed in accordance with a prescribed event when the prescribed event occurs, timing information that specifies a timing for making a setting change, and trigger information that specifies an action based on which the base station apparatus and the mobile station apparatus compute the setting change timing for the base station apparatus and the mobile station apparatus, respectively; and
a control unit which, when the action specified in the trigger information occurs, determines the setting change timing in accordance with the timing information included in the setting change information, and effects the setting change at the determined timing in accordance with the setup information included in the setting change information.

16. A setting change method for use in a mobile communication system comprising a base station apparatus and a mobile station apparatus, wherein
the base station apparatus, which stores setting change information which includes setup information that is changed in accordance with a prescribed event when the prescribed event occurs, timing information that specifies a timing for making a setting change, and trigger information that specifies an action based on which the base station apparatus and the mobile station apparatus compute the setting change timing for the base station apparatus and the mobile station apparatus, respectively, transmits, in advance of occurrence of the prescribed event, the setting change information to the mobile station apparatus located within a communication area served by the base station apparatus, and
when the action specified in the trigger information occurs, the base station apparatus determines the setting change timing in accordance with the timing information included in the setting change information, and effects the setting change at the thus determined timing in accordance with the setup information included in the setting change information, and wherein
the mobile station apparatus receives the setting change information, and
when the action specified in the trigger information included in the setting change information occurs, the mobile station apparatus determines the setting change timing in accordance with the timing information included in the setting change information, and effects the setting change at the determined timing in accordance with the setup information included in the setting change information.

\* \* \* \* \*